US 9,419,284 B2

United States Patent
Fujikawa et al.

(10) Patent No.: US 9,419,284 B2
(45) Date of Patent: Aug. 16, 2016

(54) BINDER RESIN FOR ELECTRODE OF NONAQUEOUS ELECTROLYTE SECONDARY BATTERY, SLURRY COMPOSITION, ELECTRODE FOR NONAQUEOUS ELECTROLYTE SECONDARY BATTERY, AND NONAQUEOUS ELECTROLYTE SECONDARY BATTERY

(71) Applicant: Mitsubishi Rayon Co., Ltd., Tokyo (JP)

(72) Inventors: Daisuke Fujikawa, Hiroshima (JP);
Fumino Momose, Hiroshima (JP);
Mitsufumi Nodono, Hiroshima (JP);
Masakazu Ito, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 372 days.

(21) Appl. No.: 13/737,024

(22) Filed: Jan. 9, 2013

(65) Prior Publication Data

US 2013/0143116 A1    Jun. 6, 2013

Related U.S. Application Data

(63) Continuation-in-part of application No. PCT/JP2011/065710, filed on Jul. 8, 2011.

(30) Foreign Application Priority Data

Jul. 9, 2010    (JP) ................ 2010-156604

(51) Int. Cl.
*H01M 4/02* (2006.01)
*H01M 4/62* (2006.01)
*C08F 20/44* (2006.01)
*H01M 4/13* (2010.01)

(52) U.S. Cl.
CPC ............. *H01M 4/622* (2013.01); *C08F 20/44* (2013.01); *H01M 4/13* (2013.01)

(58) Field of Classification Search
USPC .............. 429/209–246, 208; 29/623.1–623.5
See application file for complete search history.

(56) References Cited

U.S. PATENT DOCUMENTS

| 3,988,426 A | 10/1976 | Ogawa et al. |
| 4,016,221 A * | 4/1977 | Kudo et al. ............... 525/64 |
| 2009/0053603 A1 | 2/2009 | Hoshiba et al. |
| 2011/0203186 A1* | 8/2011 | Oshima et al. ............ 51/298 |

FOREIGN PATENT DOCUMENTS

| JP | 2005-327630 A | 11/2005 |
| JP | 2010-097817 A | 4/2010 |
| JP | 2011-165456 A | 8/2011 |
| WO | 2006/101182 A1 | 9/2006 |

OTHER PUBLICATIONS

International Search Report issued in related International Patent Application No. PCT/JP2011/065710 dated Oct. 18, 2011.
Office Action issued in corresponding Chinese Patent Application No. 201180033671.2 dated Jul. 3, 2014.
Office Action issue in corresponding Chinese Patent Application No. 201180033671.2 dated Mar. 10, 2015.

* cited by examiner

*Primary Examiner* — Basia Ridley
*Assistant Examiner* — Caitlin Wilmot
(74) *Attorney, Agent, or Firm* — Morgan, Lewis & Bockius LLP

(57) ABSTRACT

A binder resin for an electrode of a nonaqueous electrolyte secondary battery is provided, which is used as the binder resin in a slurry composition for an electrode of a nonaqueous electrolyte secondary battery, containing a binder resin, an active material and an organic solvent.

20 Claims, No Drawings

BINDER RESIN FOR ELECTRODE OF NONAQUEOUS ELECTROLYTE SECONDARY BATTERY, SLURRY COMPOSITION, ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a binder resin for an electrode of a nonaqueous electrolyte secondary battery, a slurry composition, an electrode for a nonaqueous electrolyte secondary battery, and a nonaqueous electrolyte secondary battery.

BACKGROUND ART

A secondary battery is used for low-current household device applications such as notebook PC and cellular phone, or as a storage battery of a hybrid car, an electric car or the like. In these applications, as the secondary battery, a lithium ion secondary battery that is a nonaqueous electrolyte secondary battery is frequently used, because it has a high energy density.

In general, an electrode having a current collector such as metal foil and an electrode mixture layer provided on the current collector is used as the electrode of a nonaqueous electrolyte secondary battery, and an electrode active material and a conduction aid are held by a binder in the electrode mixture layer. Such an electrode is produced by kneading an electrode active material, a conduction aid, a binder and a liquid medium to prepare a slurry, coating the slurry on one surface or both surfaces of a current collector by means of a transfer roller or the like, removing the liquid medium by drying to form an electrode mixture layer, and thereafter, if desired, compression-molding the assembly by means of a roll press machine or the like. As the liquid medium, a medium capable of dispersing an electrode active material and a conduction aid and dissolving a binder is used.

Conventionally, polyvinylidene fluoride (PVDF) or styrene butadiene rubber (SBR) has been used as the binder for an electrode of a nonaqueous electrolyte secondary battery. In particular, PVDF has the advantages of, for example, exhibiting good rheology characteristics (thixotropy) when formed into a slurry and being electrochemically stable in a positive or negative electrode, and therefore is used for general purposes.

However, PVDF or SBR has a problem of low binding force. Therefore, when PVDF or SBR is used as the binder, it has been difficult to increase the capacity of the nonaqueous electrolyte secondary battery or enhance the battery performance such as rate characteristics and cycle characteristics. For example, an increase in the amount of a conduction aid is effective in enhancing the rate characteristics which are affected by the ease of electron transfer. In order to increase the amount of the conduction aid in a limited space inside a battery, the amount of the binder must be reduced, but when the binder amount is reduced, the adherence between the current collector and the electrode mixture layer or the adherence between electrode active materials is reduced and the electrode mixture layer is separated from the current collector due to repeated charging/discharging or the electrode active material drops off from the electrode mixture layer, leading to reduction in the battery performance.

To solve such problems, a method of specifying various parameters so as to achieve adherence or the like to the current collector has been proposed. For example, Patent Document 1 has proposed a method where in a binder composition containing a polymer having a THF gel content of 5% or less and an organic solvent using N-methylpyrrolidone (NMP) as the main solvent, the second virial coefficient measured by a static light scattering method is specified as being not more than a specific value and the radius of gyration of the polymer is specified as falling in a specific range. Also, Patent Document 2 has proposed a method where two kinds of dispersion liquids each obtained by dispersing a polymer having a primary particle mode diameter in a specific range are mixed in specific blending amounts.

Further, as the method for improving such defects, there has been proposed a method where an acidic group such as carboxyl group and phosphoric acid group is introduced into a polyacrylonitrile-based (hereinafter, may be referred to as "PAN-based") resin having an electrochemical stability comparable to that of PVDF and the binding property of the binder with a current collector is thereby enhanced (see, Patent Documents 3, 4 and 5).

PRIOR ART

Patent Document

[Patent Document 1] Kokai (Japanese Unexamined Patent Publication) No. 2007-087881
[Patent Document 2] Kokai No. 2003-100298
[Patent Document 3] Japanese Patent No. 2,047,652
[Patent Document 4] Kokai (Japanese Unexamined Patent Publication) No. 2005-327630
[Patent Document 5] International Publication No. 2006/101182, pamphlet

SUMMARY OF THE INVENTION

Problems to be Solved by the Invention

However, in the methods of Patent Documents 1 and 2 using a small particle size latex, the thixotropy of the slurry is insufficient, because the small particle size latex is butadiene rubber or acrylic rubber and swells with NMP.

The thixotropy of the slurry affects the storage stability of the slurry or the battery performance. For example, when the slurry has poor thixotropy, the slurry is not changed to a low viscosity slurry at the coating (when subjected to a shear stress) and cannot be successfully coated, or after coating, a high viscosity is not recovered, causing a change in the internal structure of the electrode mixture layer (for example, localization of the active material due to precipitation). As a result, for example, the adherence between the current collector and the electrode mixture layer, or the smoothness of the electrode mixture layer is impaired, and the battery performance is reduced.

Furthermore, the latex is in many cases a composition having a low glass transition temperature and therefore, when formed into a powder, polymer chains are entangled, and there arises a problem that the powder can be hardly redispersed in water. Accordingly, the latex is distributed in the state of containing water, and the transportation cost is disadvantageously increased. In addition, because a rust-preventing agent is added to a binder of water dispersion type, a battery using a binder of water dispersion type may fail in keeping the discharge capacity high for a long period of time (cycle characteristics) or may be reduced in the battery performance, for example, may be reduced in the rate characteristics.

Therefore, supplying a powdered binder that is used by dissolving it in water or an organic solvent at the production of a battery, for example, by dissolving a PVDF powder in NMP has been demanded.

Furthermore, in a nonaqueous electrolyte secondary battery produced using a binder resin containing a halogen element, such as PVDF, a hydrogen halide such as hydrogen fluoride is generated due to an electrochemical reaction between the electrolyte and the binder resin during charging/discharging and may cause the active material or the like to corrode.

Further, in the methods of Patent Documents 1 to 3, it has been found that the acidic group such as carboxyl group and phosphoric acid group introduced into the binder resin strongly binds lithium ion to reduce the mobility of lithium ion and the ionic conductivity in the vicinity of the active material is thereby decreased. Also, when such an acidic group is excessively present in a copolymer, this may increase the viscosity of a slurry containing an active material, a conduction aid, a solvent and a binder resin composition and reduce the coating characteristics. Reduction in the coating characteristics may cause disproportionation of the composition in an electrode mixture layer of the electrode, thickness unevenness of the electrode mixture layer, or striation/starvation of the electrode surface and in turn, incur reduction in the productivity. Accordingly, it is demanded to reduce the amount of the acidic group introduced into the binder resin while maintaining the binding property with the current collector.

Under these circumstances, the present invention has been made, and an object of the present invention is to provide a binder resin capable of giving a slurry with good thixotropy and being distributed in a powder form and free from a halogen element, a slurry composition using the binder resin, an electrode for a nonaqueous electrolyte secondary battery, and a nonaqueous electrolyte secondary battery.

Further, an object of the present invention is to provide a binder resin composition for an electrode of a nonaqueous electrolyte battery, which has excellent binding property with a current collector. Another object of the present invention is to provide a slurry composition for an electrode of a nonaqueous electrolyte battery, which exhibits good slurry storage stability. Still another object of the present invention is to provide an electrode for a battery, which has a uniform composition, and a battery.

Means to Solve the Problems

As a result of intensive studies, the present inventors have found the following.

When a binder resin containing no halogen element is dissolved in an organic solvent used as a liquid medium in the slurry preparation process to a concentration of 5% that is equal to the concentration in a slurry and the obtained resin solution is measured by the dynamic light scattering method (DLS), the particle size distribution can be measured in some cases, even though the resin is completely dissolved at glance. The sum (nanogel intensity) of scattering intensities observed in the particle diameter range of 1 to 100 nm at the measurement by DLS shows a positive correlation with the thixotropy of the slurry.

The present invention has been made based on the above finding and has the following aspects.

[1] A binder resin for an electrode of a nonaqueous electrolyte secondary battery, which is used as the binder resin in a slurry composition for an electrode of a nonaqueous electrolyte secondary battery, containing a halogen element-free binder resin, an active material and an organic solvent, wherein when the binder resin is dissolved in the organic solvent to form a solution having a concentration of 5 mass % and the particle size distribution is measured at 25° C. by the dynamic light scattering method, the binder resin for an electrode of a nonaqueous electrolyte secondary battery satisfies the following formula (1):

$$I_S \geq 30 \quad (1)$$

wherein $I_S$ indicates the sum of scattering intensities observed in the particle diameter range of 1 to 100 nm.

[2] The binder resin for an electrode of a nonaqueous electrolyte secondary battery according to [1], which is used as the binder resin in a slurry composition for an electrode of a nonaqueous electrolyte secondary battery, containing a halogen element-free binder resin, an active material, a conduction aid and an organic solvent, wherein in a shear rate program of starting the measurement from 0.03 sec$^{-1}$, measuring the shear rate until 100 sec$^{-1}$ along with transfer to a high shear rate, and again measuring the shear rate until 0.03 sec$^{-1}$ along with transfer to a low shear rate, when a slurry composition obtained by mixing 100 parts by mass of an active material, 5 parts by mass of a conduction aid and 2 parts by mass of the binder resin of the present invention with 40 parts by mass of an organic solvent by means of a rotation/revolution stirrer is measured for rheology at 25° C., the binder resin for an electrode of a nonaqueous electrolyte secondary battery satisfies the following formula (2) and at the same time, dissolves in an organic solvent:

$$\eta_{0.1}/\eta_{80} \geq 20 \quad (2)$$

wherein $\eta_{0.1}$ indicates a viscosity at a shear rate of 0.1 sec$^{-1}$ when the viscoelasticity is measured while changing the shear rate from 100 sec$^{-1}$ to 0.03 sec$^{-1}$, and $\eta_{80}$ indicates a viscosity at a shear rate of 80 sec$^{-1}$ when the viscoelasticity is measured while changing the shear rate from 100 sec$^{-1}$ to 0.03 sec$^{-1}$.

[3] The binder resin for an electrode of a nonaqueous electrolyte secondary battery according to [1], wherein the binder resin contains a polymer having a vinyl cyanide monomer unit.

[4] A slurry composition for an electrode of a nonaqueous electrolyte secondary battery, containing the halogen element-free binder resin according to [1], an active material and an organic solvent.

[5] An electrode for a nonaqueous electrolyte secondary battery, comprising a current collector and an electrode mixture layer provided on the current collector, wherein the electrode mixture layer contains the binder resin for an electrode of a nonaqueous electrolyte secondary battery according to [1] and an active material.

[6] An electrode for a nonaqueous electrolyte secondary battery, comprising a current collector and an electrode mixture layer provided on the current collector, wherein the electrode mixture layer is obtained by coating the slurry composition for an electrode of a nonaqueous electrolyte secondary battery according to [4] on the current collector and drying the coating.

[7] A nonaqueous electrolyte secondary battery, comprising the electrode for a nonaqueous electrolyte secondary battery according to [5].

[8] A binder resin composition for an electrode of a nonaqueous electrolyte battery, comprising a polymer (A) having a vinyl cyanide monomer (a1) unit as the main component and a polymer (B) containing a phosphoric acid-containing monomer (b1) unit.

[9] The binder resin composition for an electrode of a nonaqueous electrolyte battery according to [8], wherein the content of the phosphoric acid group-containing monomer (b1) unit is from 0.01 to 0.5 mol/kg (in the binder resin composition).

[10] A slurry composition for an electrode of a nonaqueous electrolyte battery, comprising the binder resin composition for an electrode of a nonaqueous electrolyte battery according to [8], an active material and an organic solvent.

[11] An electrode for a nonaqueous electrolyte battery, comprising an electrode mixture layer containing the binder resin composition for an electrode of a nonaqueous electrolyte battery according to [8] and an active material, and a current collector.

[12] A nonaqueous electrolyte battery, comprising the electrode for a nonaqueous electrolyte battery according to [11].

[13] A slurry composition for an electrode of a nonaqueous electrolyte battery, comprising the binder resin composition for an electrode of a nonaqueous electrolyte battery according to [9], an active material and an organic solvent.

[14] An electrode for a nonaqueous electrolyte battery, comprising an electrode mixture layer containing the binder resin composition for an electrode of a nonaqueous electrolyte battery according to [9] and an active material, and a current collector.

[15] A nonaqueous electrolyte battery, comprising the electrode for a nonaqueous electrolyte battery according to [14].

Effects of the Invention

According to the present invention, a binder resin capable of giving a slurry with good thixotropy and being distributed in a powder form and free from a halogen element, a slurry composition using the binder resin, an electrode for a nonaqueous electrolyte secondary battery, and a nonaqueous electrolyte secondary battery can be provided.

By using the binder resin composition for an electrode of a nonaqueous electrolyte battery of the present invention, the binding property with a current collector can be enhanced. Also, in the binder resin composition for an electrode of a nonaqueous electrolyte battery of the present invention, the amount of an acidic group is reduced, so that reduction in the mobility of lithium ion can be suppressed.

The electrode mixture layer containing the binder resin composition for an electrode of a nonaqueous electrolyte battery of the present invention allows adjusting the slurry viscosity of the composition by the blending ratio of the polymers (A) and (B), so that reduction in the binding property with a current collector can be suppressed. Also, the slurry composition of the present invention is improved in the storage stability and furthermore, gives an electrode mixture layer having a uniform composition and a smooth surface, and in turn, it is believed that reduction in the productivity can be prevented.

The electrode for a nonaqueous electrolyte battery of the present invention is excellent in the binding property of the binder resin composition with a current collector and therefore, exhibits excellent cycle characteristics in repeated charging/discharging. Also, the amount of the binder resin composition that becomes a resistance in a battery can be reduced and therefore, it is anticipated that the battery can respond to rapid charging.

MODE FOR CARRYING OUT THE INVENTION

Binder Resin for Electrode of Nonaqueous Electrolyte Secondary Battery

The binder resin for an electrode of a nonaqueous electrolyte secondary battery (sometimes simply referred to as binder resin) of the present invention is a binder resin for an electrode of a nonaqueous electrolyte secondary battery, which is used as the binder resin in a slurry composition for an electrode of a nonaqueous electrolyte secondary battery, containing a halogen element-free binder resin, an active material and an organic solvent, wherein when the binder resin is dissolved in the organic solvent to form a solution having a concentration of 5 mass % and the particle size distribution is measured at 25° C. by the dynamic light scattering method, the binder resin satisfies the following formula (1):

$$I_S \geq 30 \tag{1}$$

wherein $I_S$ indicates the sum of scattering intensities observed in the particle diameter range of 1 to 100 nm.

The binder resin of the present invention is not particularly limited as long as it satisfies formula (1) and does not contain a halogen element such as fluorine, chlorine and iodine, but in view of good electrochemical stability, the binder resin preferably contains a polymer having a vinyl cyanide monomer (hereinafter, referred to as polymer (A1)).

Polymer (A1)

The polymer (A1) has a vinyl cyanide monomer unit.

The vinyl cyanide monomer unit means a constituent unit derived from a vinyl cyanide monomer (hereinafter, referred to as monomer (m1)).

Examples of the monomer (m1) include acrylonitrile, methacrylonitrile, α-cyanoacrylate, dicyanovinylidene, and fumaronitrile. Among these, acrylonitrile is preferred in view of easy polymerization and easy availability.

As for the monomer (m1), one kind may be used alone, or two or more kinds may be used in appropriate combination.

The content percentage of the monomer (m1) unit in the polymer (A1) is preferably 50 mol % or more, more preferably 55 mol % or more, still more preferably 60 mol % of more, based on the total (100 mol %) of all constituent units constituting the polymer (A1). When the polymer (A1) is a polymer (a homopolymer or a copolymer) containing the monomer (m1) unit at a content percentage of 50 mol % or more, the electrochemical stability is excellent. Also, the polymer is easily dissolved in the organic solvent used for slurry preparation, and an electrode mixture layer excellent, for example, in the adherence to a current collector can be formed.

The upper limit of the content percentage of the monomer (m1) unit is not particularly limited and may be 100 mol %. In the case of optionally incorporating a constituent unit (an optional constituent unit) other than the monomer (m1), the content percentage can be appropriately set by taking into consideration the balance with the optional constituent unit.

The polymer (A1) may have a constituent unit (an optional constituent unit) other than the monomer (m1) unit, if desired. By the optional constituent unit, for example, adherence of the electrode mixture layer to a current collector or mechanical characteristics such as rigidity and bending strength can be adjusted.

The monomer (optional monomer) working out to a source for deriving the optional constituent unit therefrom may be sufficient if it is copolymerizable with the unit (m1), and the monomer used may be appropriately selected from monomers known as the monomer used in the binder resin for an electrode of a battery.

Specific examples of the optional monomer include:

a phosphoric acid group-containing (meth)acrylate and a salt thereof, such as 2-(meth)acryloyloxyethyl acid phosphate, 2-(meth)acryloyloxyethyl acid phosphate.monoethanolamine salt, diphenyl((meth)acryloyloxyethyl) phosphate, (meth)acryloyloxypropyl acid phosphate, 3-chloro-2-acid-.phosphoxypropyl (meth)acrylate, acid.phosphoxypolyoxyethylene glycol mono(meth)acrylate, and acid.phosphoxypolyoxypropylene glycol (meth)acrylate;

a phosphoric acid group-containing allyl compound and a salt thereof, such as allylalcohol acid phosphate;

a tertiary salt or a quaternary ammonium salt of dimethylaminoethyl (meth)acrylate and dimethylaminopropyl (meth)acrylamide;

a (meth)acrylate other than those described above, {for example, a (meth)acrylate having a linear, branched or cyclic structure, such as ethyl (meth)acrylate, n-propyl (meth)acrylate, iso-propyl (meth)acrylate, n-butyl (meth)acrylate, tert-butyl (meth)acrylate, n-hexyl (meth)acrylate, cyclohexyl (meth)acrylate, norbornyl (meth)acrylate, 2-hydroxyethyl (meth)acrylate, 3-hydroxy-n-propyl (meth)acrylate, 2-hydroxy-n-propyl (meth)acrylate, 4-hydroxy-n-butyl (meth)acrylate, 2-ethoxyethyl (meth)acrylate, 1-ethoxyethyl (meth)acrylate, butoxyethylene glycol (meth)acrylate, methoxypolyethylene glycol (meth)acrylate, tetrahydrofurfuryl (meth)acrylate, 2,2,2-trifluoroethyl (meth)acrylate, 2,2,3,3-tetrafluoro-n-propyl (meth)acrylate, 2,2,3,3,3-pentafluoro-n-butyl (meth)acrylate, ethylene glycol di(meth)acrylate and triethylene glycol di(meth)acrylate};

a carboxy group-containing monomer and a salt thereof, such as (meth)acrylic acid, itaconic acid and crotonic acid;

an aromatic vinyl monomer such as styrene, α-methylstyrene and hydroxystyrene;

maleimides such as maleimide and phenylmaleimide;

a sulfonic acid group-containing vinyl monomer and a salt thereof, such as (meth)allylsulfonic cid, (meth)allyloxybenzenesulfonic acid, styrenesulfonic acid and 2-acrylamide-2-methylpropanesulfonic acid;

a (meth)acrylamide compound such as (meth)acrylamide, N-methyl(meth)acrylamide, N,N-dimethyl(meth)acrylamide, N-isopropyl(meth)acrylamide and N,N-methylenebis(meth)acrylamide;

vinyl acetate, N-vinylformamide, N-vinylacetamide, N-vinylpyrrolidone, N-vinyl-ϵ-caprolactam, and N-vinylcarbazole.

Incidentally, the "vinyl monomer" is a compound having at least one vinyl group or α-methylvinyl group where the nitrogen atom bonded to the carbon atom on the α-position of a vinyl group is replaced with a methyl group.

The "acid phosphate" is a compound where out of three hydroxyl groups bonded to the phosphorus atom of phosphoric acid, one or two hydroxyl groups are esterified (a monoester or diester of phosphoric acid).

As for the optional monomer, one kind may be used alone, or two or more may be used in appropriate combination.

Among those described above, the optional monomer is preferably at least one monomer (hereinafter, referred to as monomer (m2)) selected from a phosphoric acid group-containing (meth)acrylate, a phosphoric acid group-containing vinyl monomer and a salt thereof, such as phosphoric acid group-containing allyl compound, and vinyl acetate. The monomer (m2) unit has higher polarity than that of a vinyl cyanide monomer unit, and therefore contributes to enhancement of the adherence to a current collector.

Among those described above, the monomer (m2) unit is preferably a phosphoric acid group-containing methacrylate.

The content percentage of the monomer (m2) unit in the polymer (A1) is preferably from 0 to 20 mol %, more preferably from 0.05 to 10 mol %, based on the total (100 mol %) of all constituent units constituting the polymer (A1). When the content percentage is 20 mol % or less, the polymer (A1) is sufficiently dissolved in the organic solvent used for slurry preparation, and when the content percentage is 0.05 mol % or more, for example, the adherence to a current collector can be excellent.

As the optional monomer, a polyfunctional monomer (hereinafter, referred to as monomer (m3)) having two or more polymerizable functional groups (such as vinyl group, α-methylvinyl group and allyl group) is also preferred. When the monomer (m3) is used, the polymer (A1) becomes a polymer having a crosslinked structure, and when the polymer has a crosslinked structure, the mechanical characteristics and the like are enhanced.

Examples of the monomer (m3) include N,N-methylenebisacrylamide, ethylene glycol di(meth)acrylate, and triethylene glycol di(meth)acrylate.

The content percentage of the polyfunctional monomer (m3) in the polymer (A1) is preferably from 0 to 10 mol %, more preferably from 0.01 to 5 mol %, based on the total (100 mol %) of all constituent units constituting the polymer (A1).

The polymer (A1) can be produced by a known polymerization method and can be produced, for example, by charging the monomer (m1) and, if desired, an optional monomer in a solvent and holding the system at a polymerization temperature of 0 to 90° C., preferably from 50 to 60° C., for a polymerization time of 1 to 10 hours, preferably from 2 to 4 hours.

The monomer (m1) generates a high polymerization heat at the polymerization and therefore, the polymerization is preferably allowed to proceed while adding dropwise the monomer in the solvent.

Examples of the polymerization method include bulk polymerization, suspension polymerization, emulsion polymerization, and solution polymerization. Among these, suspension polymerization is preferred. Conventionally, as the production method of a binder resin, emulsion polymerization is used for general purposes but because of use of an emulsifier, the binder resin obtained comes to contain an emulsifier. The emulsifier adversely affect the adherence to a current collector or battery characteristics. Therefore, in the case of emulsion polymerization, the after-treatment such as recovery and collection takes time and labor. According to the suspension polymerization, a resin containing substantially no emulsifier is obtained and in turn, the after-treatment is easy.

The suspension polymerization is a method of dispersing a vinyl cyanide monomer, a phosphoric acid group-containing monomer, a polymerization initiator and, if desired, an optional monomer in water, and keeping the system at an arbitrary temperature.

As the polymerization initiator for use in the suspension polymerization, a water-soluble polymerization initiator is excellent in the polymerization initiation efficiency and the like and is preferred.

Examples of the water-soluble polymerization initiator include a persulfate such as potassium persulfate, ammonium persulfate and sodium persulfate; a water-soluble peroxide such as hydrogen peroxide; and water-soluble azo compound such as 2,2'-azobis(2-methylpropionamidine) dihydrochloride. Among these, a persulfate is preferred, because the polymerization is easy.

The oxidizing agent such as persulfate may be used as a redox initiator by combining it with a reducing agent such as sodium hydrogensulfite, ammonium hydrogensulfite, sodium thiosulfate and hydrosulfite, or a polymerization promoter such as sulfuric acid, iron sulfate and copper sulfate.

In the suspension polymerization, a chain transfer agent can be used for the purpose of adjusting the molecular weight or the like. Examples of the chain transfer agent include a mercaptan compound, thioglycol, carbon tetrachloride, and an α-methylstyrene dimer, with a mercaptan compound being preferred.

In the suspension polymerization, a solvent other than water may be added so as to adjust the particle diameter of the obtained binder for an electrode of a battery. Examples of the solvent other than water include amides such as NMP, N,N-dimethylacetamide and N,N-dimethylformamide; ureas such as N,N-dimethylethyleneurea, N,N-dimethylpropyleneurea and tetramethylurea; lactones such as γ-butyrolactone and γ-caprolactone; carbonates such as propylene carbonate; ketones such as acetone, methyl ethyl ketone, methyl isobutyl ketone and cyclohexanone; esters such as methyl acetate, ethyl acetate, n-butyl acetate, butylcellosolve acetate, butylcarbitol acetate, ethylcellosolve acetate and ethylcarbitol acetate; glymes such as diglyme, triglyme and tetraglyme; hydrocarbons such as toluene, xylene and cyclohexane; sulfoxides such as dimethyl sulfoxide; sulfones such as sulfolane; and alcohols such as methanol, isopropanol and n-butanol. One of these solvents may be used alone, or two or more thereof may be used in appropriate combination.

The weight average molecular weight (Mw) of the polymer (A1) is preferably from 5,000 to 50,000,000, more preferably from 10,000 to 5,000,000. When Mw is 50,000 or more, the binding force is excellent and, for example, the adherence between the electrode mixture layer and a current collector is enhanced. When the weight average molecular weight is 5,000,000 or less, the solubility in the solubility in the organic solvent used for slurry preparation is good. Also, the obtained slurry composition is kept from having an excessively high viscosity and ensures good coatability or the like.

The molecular weight distribution (Mw/number average molecular weight (Mn)) of the polymer (A1) is preferably from 1.05 to 10.0, more preferably from 1.1 to 5.0.

Each of Mw and Mn can be measured by gel permeation chromatography (GPC) using N,N-dimethylformamide (DMF) as the solvent and using polystyrene as the standard polymer.

In the present invention, the particle size distribution measurement by DLS is performed by forming a 5 mass % concentration solution of the binder resin, and therefore, the binder resin must have organic solvent solubility making it possible to dissolve in the organic solvent used for the preparation of a slurry composition for an electrode of a nonaqueous secondary battery and form a solution having a concentration of 5 mass % or more. Accordingly, the polymer (A1) constituting the binder resin also itself has organic solvent solubility making it possible to dissolve in the organic solvent used for the preparation of a slurry composition for an electrode of a nonaqueous secondary battery and form a solution having a concentration of 5 mass % or more.

In view of, for example, adherence to a current collector and battery characteristics, the polymer (A1) is preferably a polymer containing substantially no emulsifier.

The "containing substantially no" means that the content of the emulsifier is less than 50 mg/kg based on the entire polymer (A1). The emulsifier can be quantitatively determined by subjecting an extract liquid extracted from the polymer (A1) with use of water or the like to separation/analysis by a gas chromatography method, a high-performance liquid chromatography method or the like.

The polymer containing substantially no emulsifier can be easily produced by suspension polymerization.

The polymer (A1) contained in the binder resin of the present invention may be one kind of a polymer or two or more kinds of polymers.

In particular, when two or more kinds of polymers (A1) differing in the proportion of the monomer (m1) unit contained and/or Mw are used, the value of $I_S/I_T$ in formula (1) can be easily adjusted by controlling the blending ratio therebetween, and this is preferred.

In the case where one kind of a polymer is used alone as the polymer (A1), the polymer (A1) is preferably the following polymer:

Polymer (A1-11): a copolymer containing 99.89 to 80 mol % of the monomer (m1) unit, from 0.1 to 19.99 mol % of a vinyl acetate unit, and from 0.01 to 10 mol % of an N,N-methylenebisacrylamide unit;

Polymer (A1-12): a copolymer containing from 99.9 to 60 mol % of the monomer (m1) unit and from 0.1 to 40 mol % of N-vinylacetamide unit; or Polymer (A1-13): a copolymer containing from 99.9 to 60 mol % of the monomer (m1) unit and from 0.1 to 40 mol % of N-vinylformamide unit.

In the case of using a plurality of kinds of polymers (A1) in combination as the polymer (A1), preferred examples of the combination of polymers (A1) include the followings:

Combination 1:
a combination of Polymer (A1-21) composed of a monomer (m1) unit and Copolymer (A1-22) containing from 99.99 to 85 mol % of a monomer (m1) unit and from 0.01 to 15 mol % of a phosphoric acid group-containing (meth)acrylate unit; and Combination 2:
a combination of Polymer (A1-23) containing from 99.9 to 85 mol % of a monomer (m1) unit and from 0.1 to 15 mol % of a vinyl acetate unit and Copolymer (A1-22).

The binder resin of the present invention may contain a polymer (hereinafter, referred to as polymer (A2)) other than the polymer (A1).

However, considering adherence to a current collector or flexibility of an electrode mixture, the content of the polymer (A1) in the binder resin of the present invention is preferably 50 mass % or more, more preferably 60 mass % or more, still more preferably 70 mass % or more, based on the resin solid content (100 mass %).

The upper limit of the content of the polymer (A1) is not particularly limited and may be 100 mass %. That is, the binder resin of the present invention may be composed of the polymer (A1).

Polymer (A2)

The polymer (A2) is not particularly limited as long as it does not have a monomer (m1) unit and has solubility making it possible to dissolve in the organic solvent used for the preparation of a slurry composition for an electrode of a nonaqueous secondary battery and form a solution having a concentration of 5 mass % or more, and the polymer may be appropriately selected from polymers proposed hereinabove as the binder resin for an electrode of a nonaqueous secondary battery. Examples of such a polymer include a styrene-butadiene copolymer (SBR) and a methyl methacrylate-butadiene-styrene copolymer (MBS resin).

$I_S$

When the binder resin of the present invention is dissolved in the organic solvent used at the mixing with an active material and an organic solvent for the preparation of a slurry composition to form a solution having a concentration of 5 mass % and the particle size distribution is measured at 25° C. by DLS, the binder resin satisfies the following formula (1):

$$I_S \geq 30 \qquad (1)$$

wherein $I_S$ indicates the sum of scattering intensities observed in the particle diameter range of 1 to 100 nm.

The concentration of 5 mass % is an average value as the concentration of a binder resin in a slurry used for the production of an electrode for a nonaqueous secondary battery. That is, the value measured in the particle size distribution measurement above can be said to reflect the state of the binder resin in the slurry composition.

In the case where a resin having very high solubility for an organic solvent is used as the binder resin, $I_S$ cannot be measured due to lack of strength, but when the solubility is decreased, it is possible to measure $I_S$, even though the resin is dissolved at glance. This is considered because polymer molecules are folded to make a lump and the size of the lump is detected as a particle diameter by DLS.

The value of $I_S$ in formula (1) is correlated with the thixotropy of a slurry obtained by mixing the binder resin with an active material and an organic solvent, and as the value of $I_S$ of the binder resin is higher, the thixotropy of the obtained slurry composition is increased.

When the value of $I_S$ is 30 or more, i.e., when the absolute value of scattering intensity of a particle having a particle diameter of 1 to 100 nm is 30 or more, at the time of forming an electrode for a nonaqueous electrolyte secondary battery by using the slurry, the electrode mixture layer formed can be sufficiently uniform, and a nonaqueous secondary battery using the electrode becomes a battery having substantially excellent battery characteristics.

On the other hand, if the value of $I_S$ is less than 30, for example, in the case where the binder resin is completely dissolved and $I_S$ cannot be measured or where the scattering intensity of a particle of more than 100 nm is large, the uniformity of the obtained slurry composition becomes insufficient.

$I_S$ is preferably 40 or more, more preferably 50 or more. $I_S$ is preferably 900 or less, more preferably 600 or less. When the value of $I_S$ is 900 or less, the viscosity of the obtained slurry composition is kept lowered and it becomes easy to carry out coating.

Incidentally, in Patent Document 1 recited in Background Art, the radius of gyration of the polymer is measured using a solution obtained through dilution with NMP or n-heptane by a static light scattering method, but the concentration of the solution is as very low as 0.2 to 0.8%. Therefore, the radius of gyration greatly differs from the particle diameter of the polymer in the slurry. Also, in Patent Document 2, a polymer latex is produced by emulsion polymerization using water as the polymerization medium and thereafter, the water is replaced by NMP to form a binder composition. The mode diameter of a primary particle is measured before replacement by NMP, i.e., in a latex state, and greatly differs from the particle diameter of the polymer in the slurry.

The "latex" and the "solution can be discriminated by whether or not the particle diameter can be observed by the laser diffraction particle diameter distribution measurement. In the case of "solution", the particle diameter is not observed by the laser diffraction particle diameter distribution measurement.

The value of $I_S$ can be adjusted by the solubility for the above-described organic solvent, the composition of the constituent unit, the weight average molecular weight, the stereoregularity, the crosslink density or the like, of the polymer contained in the binder resin. The factors which decrease the value of $I_S$ include increase in solubility; increase in ratio of a vinyl cyanide monomer unit or a phosphoric acid-containing monomer unit in a binder resin; decrease in weight average molecular weight (Mw); decrease in syndiotacticity; increase in isotacticity; and decrease in crosslink density. In this connection, it should be noted that if a weight average molecular weight (Mw) is too low, the $I_S$ will be increased, and the relevant threshold is about 10,000,000.

For example, in the case of using a certain polymer, if the scattering intensity of a particle of more than 100 nm is large, i.e., if $I_S$ is less than 30, the $I_S$ becomes large when a polymer having higher solubility for the above-described organic solvent or water than that of the certain polymer is blended.

Also, in the case where the binder resin is completely dissolved and $I_S$ cannot be measured, there is a tendency that as the weight average molecular weight increases, the solubility for the above-described organic solvent or water is reduced and the $I_S$ becomes large.

$I_S/I_T$

When the binder resin of the present invention is dissolved in the organic solvent used at the mixing with an active material, an organic solvent and the like for the preparation of a slurry composition to form a solution having a concentration of 5 mass % and the particle size distribution is measured at 25° C. by DLS, the binder resin satisfies the following formula (1):

$$0.05 \leq I_S/I_T \qquad (1)$$

wherein $I_T$ indicates the sum of scattering intensities observed in the particle diameter range of 1 to 100,000 nm, and $I_S$ indicates the sum of scattering intensities observed in the particle diameter range of 1 to 100 nm.

The value of $I_S/I_T$ in formula (1) is also correlated with the thixotropy of a slurry obtained by mixing the binder resin with an active material, an organic solvent and the like, and as the value of $I_S/I_T$ of the binder resin is higher, the thixotropy of the obtained slurry composition is increased.

When the value of $I_S/I_T$ is 0.05 or more, i.e., when the percentage of a particle having a particle diameter of 1 to 100 nm (the amount of a particle of 1 to 100 nm) out of particles having a particle diameter of 1 to 100,000 nm is 5% or more, at the time of forming an electrode for a nonaqueous electrolyte secondary battery by using the slurry, the electrode mixture layer formed can be sufficiently uniform, and a nonaqueous secondary battery using the electrode becomes a battery having substantially excellent battery characteristics.

On the other hand, if the value of $I_S/I_T$ is less than 0.05, for example, in the case where the binder resin is completely dissolved and both $I_T$ and $I_S$ cannot be measured or where the value of $I_S/I_T$ exceeds 0.95, i.e., where the percentage of a particle of more than 100 nm to 100,000 nm exceeds 95%, the uniformity of the obtained slurry composition becomes insufficient.

$I_S/I_T$ is preferably 0.07 or more, more preferably 0.10 or more.

The possible upper limit of $I_S/I_T$ is 1 and is preferably closer to 1 in view of thixotropy but in terms of ease of re-stirring of the slurry, is preferably 0.99 or less, more preferably 0.97 or less.

The value of $I_S/I_T$ can be adjusted by the solubility for the above-described organic solvent, the composition of the constituent unit, the weight average molecular weight, the stereoregularity, the crosslink density or the like, of the polymer contained in the binder resin.

For example, in the case of using a certain polymer, if $I_S/I_T$ is less than 0.05, the $I_S/I_T$ becomes large when a polymer having higher solubility for the above-described organic solvent or water than that of the certain polymer is blended.

Also, there is a tendency that as the weight average molecular weight is larger, the solubility for the above-described organic solvent is reduced and the $I_S/I_T$ becomes large. $\eta_{0.1}/\eta_{80}$ The binder resin of the present invention is a binder resin for an electrode of a nonaqueous electrolyte secondary battery, which is used as the binder resin in a slurry composition for an electrode of a nonaqueous electrolyte secondary battery, containing the binder resin, an active material, a conduction aid and an organic solvent, wherein in a shear rate program of starting the measurement from $0.03\ \text{sec}^{-1}$, measuring the shear rate until $100\ \text{sec}^{-1}$ along with transfer to a high shear rate (the duration is 5 minutes), and again measuring the shear rate until $0.03\ \text{sec}^{-1}$ along with transfer to a low shear rate (the duration is 5 minutes), when a slurry composition obtained by mixing 100 parts of an active material, 5 parts of a conduction aid and 2 parts of the binder resin of the present invention with 40 parts of an organic solvent by means of a rotation/revolution stirrer is measured for rheology at 25° C., the binder resin for an electrode of a nonaqueous electrolyte secondary battery satisfies the following formula (2):

$$\eta_{0.1}/\eta_{80} \geq 20 \quad (2)$$

wherein $\eta_{0.1}$ indicates a viscosity at a shear rate of $0.1\ \text{sec}^{-1}$ when the viscoelasticity is measured while changing the shear rate from $100\ \text{sec}^{-1}$ to $0.03\ \text{sec}^{-1}$, and $\eta_{80}$ indicates a viscosity at a shear rate of $80\ \text{sec}^{-1}$ when the viscoelasticity is measured while changing the shear rate from $100\ \text{sec}^{-1}$ to $0.03\ \text{sec}^{-1}$.

The active material used in the preparation of the above-described slurry is lithium cobaltate (LCO) in the case of a positive electrode and is graphite in the case of a negative electrode.

The rheology of the slurry ma be measured by using either a stress control rheometer or a strain control rheometer, but in view of slurry viscosity, a stress control rheometer is preferred. The conditions such as plate used for the measurement are not particularly limited but in terms of applicability over a wide slurry viscosity range, it is preferred to use a cone/plate having a diameter of 40 mm and an angle of 2° and set the gap to 69 mm. The measurement temperature is set to 20° C.

In the shear rate program, the measurement is started from $0.03\ \text{sec}^{-1}$ and after measuring the shear rate until $100\ \text{sec}^{-1}$ along with transfer to a high shear rate, the shear rate is again measured until $0.03\ \text{sec}^{-1}$ along with transfer to a low shear rate.

$\eta_{80}$ and $\eta_{0.1}$ are viscosities at shear rates of $80\ \text{sec}^{-1}$ and $0.1\ \text{sec}^{-1}$, respectively, after reaching the maximum shear rate of $100\ \text{sec}^{-1}$ and then transferring to a low shear rate in the shear rate program.

As the value of $\eta_{0.1}/\eta_{80}$ is larger, the thixotropy of the slurry is higher. When the value of $\eta_{0.1}/\eta_{80}$ is 20 or more, the thixotropy can be said to be good.

If the value of $\eta_{0.1}/\eta_{80}$ is less than 20, the active material or conduction aid is precipitated with aging, and the electrode mixture layer becomes non-uniform.

The upper limit of $\eta_{0.1}/\eta_{80}$ is not particularly limited but is preferably 500 from the standpoint of preventing abrupt solidification of the slurry after coating the slurry.

The value of $\eta_{0.1}/\eta_{80}$ can be adjusted by the solubility for the above-described organic solvent or water, the composition of the constituent unit, the weight average molecular weight, the stereoregularity, the crosslink density or the like, of the polymer contained in the binder resin.

For example, in the case of a slurry using a certain polymer, if the value of $\eta_{0.1}/\eta_{80}$ is less than 20, the $\eta_{0.1}/\eta_{80}$ becomes large when a polymer having higher solubility for the above-described organic solvent or water than that of the certain polymer is blended.

Also, in the case of a slurry using a certain polymer, if the value of $\eta_{0.1}/\eta_{80}$ exceeds 500, there is a tendency that when a polymer small in the weight average molecular weight or viscosity average molecular weight is blended, the solubility for the organic solvent is increased and $\eta_{0.1}/\eta_{80}$ becomes small.

Slurry Composition for Electrode of Nonaqueous Electrolyte Secondary Battery

The slurry composition for an electrode of a nonaqueous electrolyte secondary battery (hereinafter, simply referred to as slurry) of the present invention contains the binder resin of the present invention, an active material and an organic solvent. That is, the slurry of the present invention is a slurry containing a halogen element-free binder resin, an active material and an organic solvent, wherein when the binder resin is dissolved in the solvent to form a solution having a concentration of 5 mass % and the particle size distribution is measured at 25° C. by the dynamic light scattering method, the slurry composition for an electrode of a nonaqueous electrolyte secondary battery satisfies the following formula (1):

$$I_S \geq 30 \quad (1)$$

wherein $I_S$ indicates the sum of scattering intensities observed in the particle diameter range of 1 to 100 nm.

Also, the slurry of the present invention is a slurry for an electrode of a nonaqueous electrolyte secondary battery, containing a halogen element-free binder resin, an active material and an organic solvent, wherein in a shear rate program of starting the measurement from $0.03\ \text{sec}^{-1}$, measuring the shear rate until $100\ \text{sec}^{-1}$ along with transfer to a high shear rate, and again measuring the shear rate until $0.03\ \text{sec}^{-1}$ along with transfer to a low shear rate, when a slurry composition obtained by mixing 100 parts of an active material, 5 parts of acetylene black and 2 parts of the binder resin of the present invention with 40 parts of an organic solvent by means of a rotation/revolution stirrer is measured for rheology at 25° C., the slurry composition for an electrode of a nonaqueous electrolyte secondary battery satisfies the following formula (2):

$$\eta_{80}/\eta_{0.1} \geq 20 \quad (2)$$

wherein $\eta_{0.1}$ indicates a viscosity at a shear rate of $0.1\ \text{sec}^{-1}$ when the viscoelasticity is measured while changing the shear rate from $100\ \text{sec}^{-1}$ to $0.03\ \text{sec}^{-1}$, and $\eta_{80}$ indicates a viscosity at a shear rate of $80\ \text{sec}^{-1}$ when the viscoelasticity is measured while changing the shear rate from $100\ \text{sec}^{-1}$ to $0.03\ \text{sec}^{-1}$.

The binder resin for use in the slurry of the present invention is the binder resin of the present invention, and its detailed description is omitted here.

The content of the binder resin in the slurry of the present invention is not particularly limited but is preferably from 0.01 to 10 mass %, more preferably from 0.1 to 7 mass %, based on the total solid content (all components excluding an organic solvent) of the slurry. When the content is 0.01 mass % or more, the adherence between the electrode mixture layer formed using the slurry and a current collector is more enhanced, and when the content is 10 mass % or less, an active material or an optional conduction aid can be sufficiently incorporated and therefore, the battery characteristics are enhanced.

The active material used for the slurry of the present invention is not particularly limited, and a known active material can be used according to for what type of a nonaqueous electrolyte secondary battery the electrode produced using the slurry is used.

For example, in the case of a lithium ion secondary battery, a material having a higher potential (to metal lithium) than the active material of the negative electrode (negative electrode active material) and capable of absorbing and releasing lithium ion at the charging/discharging is used as the electrode active material of the positive electrode (positive electrode active material).

Specific examples of the positive electrode active material include a lithium-containing metal composite oxide containing lithium and at least one or more kinds of metals selected from iron, cobalt, nickel, manganese and vanadium, and an electrically conductive polymer such as polyaniline, polythiophene, polyacetylene and a derivative thereof, polyparaphenylene and a derivative thereof, polypyrrole and a derivative thereof, polythienylene and a derivative thereof, polypyridinediyl and a derivative thereof, polyisothianaphthenylene and a derivative thereof, and polyarylene vinylene and a derivative thereof. As the electrically conductive polymer, a polymer of an aniline derivative soluble in an organic solvent is preferred. As for the positive electrode active material, one kind may be used alone, or two or more kinds may be used in appropriate combination.

Examples of the negative electrode active material include a carbon material such as graphite, amorphous carbon, carbon fiber, coke and active carbon; and a composite of the carbon material with silicon, a metal such as tin and silver, or an oxide thereof. As for the negative electrode active material, one kind may be used alone, or two or more kinds may be used in appropriate combination.

In a lithium ion secondary battery, it is preferred to use a lithium-containing metal composite oxide as the positive electrode active material and use graphite as the negative electrode active material. By employing such a combination, the voltage of the lithium ion secondary battery can be elevated, for example, to about 4 V or more.

The content of the active material in the slurry of the present invention is not particularly limited but is preferably from 80 to 99.9 mass %, more preferably from 85 to 99 mass %, based on the total solid content (all components excluding an organic solvent) of the slurry. When the content is 80 mass % or more, the function as an electrode mixture layer can be fully exerted, and when the content is 99.9 mass % or less, the adherence between the electrode mixture layer and a current collector is good.

The solvent used for the slurry of the present invention may be sufficient if it is a material capable of dissolving the binder resin composition and uniformly dispersing the active material, and usually, a solvent used for a slurry for an electrode of a nonaqueous secondary battery can be utilized. Examples of such a solvent include NMP, an ester-based solvent (such as ethyl acetate, n-butyl acetate, butylcellosolve acetate and butylcarbitol acetate), a glyme-based solvent (such as diglyme, triglyme and tetraglyme), and water. One of these solvents may be used, or two or more thereof may be mixed to make a mixed solvent. Examples of the mixed solvent include a mixed solution of NMP and an ester-based solvent, and a mixed solution of NMP and a glyme-based solvent.

The content of the solvent in the slurry of the present invention may be sufficient if it is a required minimum amount with which the binder resin can maintain its dissolved state at ordinary temperature, but the content is preferably from 5 to 50 mass %, more preferably from 10 to 40 mass %. The content of the solvent in the slurry is determined by taking into account the viscosity at which the slurry is easily coated when forming an electrode mixture layer by using the slurry.

The slurry of the present invention may contain, if desired, a component (optional component) other than the binder resin, the active material and the organic solvent.

Examples of the optional component include a conduction aid, an antioxidant, and a thickening agent.

Above all, in the case where the slurry of the present invention is a slurry for forming an electrode mixture layer of the positive electrode or a slurry for forming an electrode mixture layer of the negative electrode containing a metal fine particle such as silicon, the slurry preferably contains a conduction aid. By containing a conduction aid, electrical contact between active materials or between an active material and a metal fine particle can be enhanced, and the battery performance such as discharge rate characteristics of the nonaqueous electrolyte secondary battery can be more elevated.

Examples of the conduction aid include acetylene black, carbon black, graphite, channel black, fullerene, carbon nanotube, and graphene. One of these conduction aids may be used alone, or two or more thereof may be used in appropriate combination.

The content of the conduction aid in the electrode mixture layer and in the slurry of the present invention is not particularly limited but is preferably from 0.01 to 10 mass %, more preferably from 0.1 to 7 mass %, based on the total solid content (all components excluding an organic solvent) of the slurry. When the content is 0.01 mass % or more, the battery performance is more enhanced, and when the content is 10 mass % or less, the adherence between the electrode mixture layer and a current collector is good.

The slurry of the present invention can be produced by kneading the binder resin, the active material, the organic solvent and the optional component. The kneading can be performed by a known method.

At the slurry preparation, the binder resin of the present invention may be used in the powder form as it is or may be used as a resin solution by previously dissolving the binder resin in an organic solvent before mixing with the active material or the optional conduction aid.

Electrode for Nonaqueous Electrolyte Secondary Battery

The electrode for a nonaqueous electrolyte secondary battery (hereinafter, simply referred to as electrode) of the present invention comprises a current collector and an electrode mixture layer provided on the current collector, where the electrode mixture layer contains the binder resin of the present invention and an active material.

The current collector may be sufficient if it is a material having electrical conductivity, and examples thereof include a metal such as aluminum, copper and nickel.

The shape of the current collector can be determined according to the mode of the target battery, and examples thereof include a thin film, a net, and a fiber. Among these, a thin film shape is preferred.

The thickness of the current collector is not particularly limited but is preferably from 5 to 30 μm, more preferably from 8 to 25 μm.

The binder resin for use in the electrode mixture layer is the binder resin of the present invention, and its detailed description is omitted here.

The content of the binder resin in the electrode mixture layer is not particularly limited but is preferably from 0.01 to 10 mass %, more preferably from 0.1 to 7 mass %. When the content is 0.01 mass % or more, the adherence between the electrode mixture layer formed using the slurry and a current collector is more enhanced, and when the content is 10 mass % or less, an active material or an optional conduction aid can be sufficiently incorporated and therefore, the battery characteristics are enhanced.

Examples of the active material for use in the electrode mixture layer are the same as those of the active material recited in the description of the slurry of the present invention The content of the active material in the electrode mixture layer is not particularly limited but is preferably from 80 to 99.9 mass %, more preferably from 85 to 99 mass. When the content is 80 mass % or more, the function as an electrode mixture layer can be fully exerted, and when the content is 99.9 mass % or less, the adherence between the electrode mixture layer and a current collector is good.

In the case where the electrode of the present invention is the positive electrode of the positive electrode or the negative electrode containing a metal fine particle such as silicon, the electrode mixture layer preferably contains a conduction aid. By containing a conduction aid, the battery performance can be enhanced.

Examples of the conduction aid are the same as those of the active material recited in the description of the slurry of the present invention. As for the conduction aids, one kind may be used alone, or two or more kinds may be used in appropriate combination.

The content of the conduction aid in the electrode mixture layer is not particularly limited but is preferably from 0.01 to 10 mass %, more preferably from 0.1 to 7 mass %. When the content is 0.01 mass % or more, the battery performance is more enhanced, and when the content is 10 mass % or less, the adherence between the electrode mixture layer and a current collector is good.

The electrode mixture layer can be formed by coating the slurry of the present invention on a current collector and drying the coating.

In the case where the current collector is in the form of a thin film or a net, the electrode mixture layer may be provided on one surface or both surfaces of the current collector.

The method for coating the slurry may be sufficient if the slurry can be coated on a current collector to an arbitrary thickness, and is not particularly limited, but examples thereof include a doctor blade method, a dip method, a reverse roll method, a direct roll method, a gravure method, an extrusion method, and a brush coating method.

The amount coated can be appropriately set according to the thickness of the electrode mixture layer to be formed.

The coated slurry is dried to remove the organic solvent, whereby the electrode mixture layer is formed.

The drying method may be sufficient if the organic solvent can be removed, and is not particularly limited. Examples of the method include a method of heating the coating at a temperature more than the boiling point of the organic solvent, and a method of evaporating the organic solvent under reduced pressure conditions.

After the drying, the electrode mixture layer formed may be rolled, if desired. By performing the rolling, the electrode mixture layer can expand in the area and can be adjusted to an arbitrary thickness.

The thickness of the electrode mixture layer can be appropriately determined according to the kind of the active material. For example, in the case where the active material is a metal acid lithium, the thickness of the electrode mixture layer is preferably from 70 to 110 µm, more preferably from 90 to 110 µm. For example, in the case where the active material is graphite, the thickness of the electrode mixture layer is preferably from 30 to 70 µm, more preferably from 50 to 70 µm.

The electrode of the present invention can be used for either the positive electrode or the negative electrode of a nonaqueous electrolyte secondary battery. The electrode of the present invention is useful particularly as the positive electrode.

Nonaqueous Electrolyte Secondary Battery

The nonaqueous electrolyte secondary battery (hereinafter, simply referred to as battery) comprises the electrode for a nonaqueous electrolyte secondary battery of the present invention.

The "nonaqueous electrolyte secondary battery" is a battery using a water-free nonaqueous electrolyte as the electrolyte, and examples thereof include a lithium ion secondary battery. The nonaqueous electrolyte secondary battery usually has electrodes (positive electrode and negative electrode), a nonaqueous electrolyte, and a separator. For example, there is a battery fabricated by superposing and winding together a positive electrode and a negative electrode with the intervention of a separator formed of a polyethylene macroporous film or the like and housing the resulting roll in a battery container together with a nonaqueous electrolyte.

The nonaqueous electrolyte includes an electrolytic solution obtained by dissolving a solid electrolyte in an organic solvent.

Examples of the organic solvent for the electrolytic solution include carbonates such as propylene carbonate, ethylene carbonate, butylene carbonate, dimethyl carbonate, diethyl carbonate and methylethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofuran; sulfoxides such as dimethylsulfoxide; oxolanes such as 1,3-dioxolane and 4-methyl-1,3-dioxolane; nitrogen-containing compounds such as acetonitrile, nitromethane and NMP; esters such as methyl formate, methyl acetate, butyl acetate, methyl propionate, ethyl propionate and phosphoric acid triester; glymes such as diglyme, triglyme and tetraglyme; ketones such as acetone, diethyl ketone, methyl ethyl ketone and methyl isobutyl ketone; sulfones such as sulfolane; oxazolidinones such as 3-methyl-2-oxazolidinone; and sultones such as 1,3-propanesultone, 4-butanesultone and naphthasultone. One of these organic solvents may be used alone, or two or more thereof may be used in appropriate combination.

As for the solid electrolyte, a known solid electrolyte can be utilized according to the kind of the nonaqueous electrolyte secondary battery or active material. For example, in the case of a lithium ion secondary battery, any known lithium salt can be used, and examples thereof include $LiClO_4$, $LiBF_4$, $LiI$, $LiPF_6$, $LiCF_3SO_3$, $LiCF_3CO_2$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$, $Li(CF_3SO_2)_2N$ and $Li[(CO_2)_2]_2B$.

The electrolytic solution of a lithium ion secondary battery is preferably a solution obtained by dissolving $LiPF_6$ in carbonates.

In the battery of the present invention, the electrode of the present invention is used for either one or both of the positive electrode and the negative electrode. The battery of the present invention is preferably a battery where at least the positive electrode is the electrode of the present invention.

In the case where either one of the positive electrode and the negative electrode is the electrode of the present invention, a known electrode can be utilized for the other electrode.

As the separator, a known separator can be used. For instance, a porous polymer film, for example, a porous polymer film produced from a polyolefin-based polymer such as ethylene homopolymer, propylene homopolymer, ethylene/butene copolymer, ethylene/hexene copolymer and ethylene/methacrylate copolymer, can be used by itself or a laminate of these films can be used. In addition, a normal porous nonwoven fabric, for example, a nonwoven fabric composed of a high-melting-point glass fiber or a polyethylene terephthalate film, may be used, but the present invention is not limited thereto.

The method for manufacturing the battery of the present invention is not particularly limited. The production method includes, for example, a known method where a positive electrode and a negative electrode are put to face each other through a separator and spirally wound together or folded in accordance with the battery shape and then housed in a battery container and after pouring a nonaqueous electrolyte thereinto, the container is closed in a sealing manner.

The shape of the battery may be a coin, a cylinder, a box, a flat, and the like.

In another embodiment, the binder resin composition for an electrode of a nonaqueous electrolyte battery (may be simply referred to as the binder resin composition) of the present invention contains (A) a polymer having (a1) a vinyl cyanide monomer unit as the main component and (B) a polymer containing (b1) a phosphoric acid group-containing monomer unit.

The polymer (A) for use in the present invention contains (a1) a vinyl cyanide monomer unit. The polymer (A) may contain (a2) another monomer unit, if desired.

The vinyl cyanide monomer (a1) unit uses (a1) a vinyl cyanide monomer as a constituent raw material.

Examples of the vinyl cyanide monomer unit (a1) include a (meth)acrylonitrile, α-cyanoacrylate, dicyanovinylidene, and fumaronitrile.

Among these, in view of easy polymerization and easy availability, acrylonitrile is preferred.

As for the vinyl cyanide monomer (a1), one kind may be used alone, or two or more kinds may be used in combination.

The another monomer (a2) unit uses (a2) anther monomer as a constituent raw material.

Examples of the another monomer (a2) include a (meth)acrylate such as ethyl (meth)acrylate, propyl (meth)acrylate, butyl (meth)acrylate and hexyl (meth)acrylate; a carboxyl group-containing monomer and a salt thereof, such as (meth)acrylic acid, itaconic acid and crotonic acid; an aromatic vinyl monomer such as styrene and α-methylstyrene; maleimides such as maleimide and phenylmaleimide; a sulfonic acid group-containing vinyl monomer and a salt thereof, such as (meth)allylsulfonic acid, (meth)allyloxybenzenesulfonic acid, styrenesulfonic acid and 2-acrylamide-2-methylpropanesulfonic acid; (meth)acrylamide, and vinyl acetate.

Incidentally, the another monomer (a2) does not encompass a phosphoric acid group-containing monomer.

As for the another monomer (a2), one kind may be used alone, or two or more kinds may be used in combination.

The polymer (A) has (a1) a vinyl cyanide monomer unit as the main component. The content of the vinyl cyanide monomer (a1) in the polymer (A) is preferably from more than 50 mol % to 100 mol %.

When the content percentage of the vinyl cyanide monomer (a1) unit in the polymer (A) is an amount exceeding 50 mol %, the solubility or dispersibility of the binder resin composition for a solvent or a dispersion medium is enhanced and in turn, the binding property of the binder resin composition with a current collector is enhanced.

The content percentage of the another monomer (a2) unit in the polymer (A) (100 mol %) is less than 50 mol % and preferably from 0 to 5 mol %.

When the content percentage of the another monomer (a2) unit in the polymer (A) is less than 50 mol %, the solubility or dispersibility of the binder resin composition for a solvent or a dispersion medium is enhanced and in turn, the binding property of the binder resin composition with a current collector is enhanced.

The weight average molecular weight of the polymer (A) is preferably from 1,000 to 5,000,000 and for developing a sufficient binding property with a current collector, more preferably from 30,000 to 500,000.

The polymer (B) for use in the present invention contains (b1) a phosphoric acid group-containing monomer unit. Also, the polymer (B) contains (b2) another monomer. The polymer (B) preferably uses a vinyl cyanide monomer unit as the main component.

The phosphoric acid group-containing monomer (b1) unit uses (b1) a phosphoric acid group-containing monomer as a constituent raw material.

The phosphoric acid group-containing monomer (b1) indicates a vinyl monomer having a phosphoric acid group and is preferably a (meth)acrylate or allyl compound having a phosphoric acid group.

Examples of the (meth)acrylate having a phosphoric acid group include 2-(meth)acryloyloxyethyl acid phosphate, 2-(meth)acryloyloxyethyl acid phosphate.monoethanolamine salt, diphenyl((meth)acryloyloxyethyl) phosphate, (meth)acryloyloxypropyl acid phosphate, 3-chloro-2-acidphosphoxypropyl (meth)acrylate, acid.phosphoxypolyoxyethylene glycol mono(meth)acrylate, and acid.phosphoxypolyoxypropylene glycol (meth)acrylate.

Examples of the allyl compound having a phosphoric acid group include allylalcohol acid phosphate.

Among these phosphoric acid group-containing monomers (b1), 2-methacryloyloxyethyl acid phosphate is preferred, because this monomer is excellent in the binding property with a current collector and the handleability at the electrode production. As for the phosphoric acid group-containing monomer (b1), one kind may be used alone, or two or more kinds may be used in combination.

The another monomer (b2) unit uses (b2) another monomer as a constituent raw material.

Examples of the another monomer (b2) include a vinyl cyanide monomer such as (meth)acrylonitrile, α-cyanoacrylate, dicyanovinylidene and fumaronitrile; a (meth)acrylate such as ethyl (meth)acrylate, propyl (meth)acrylate, butyl (meth)acrylate and hexyl (meth)acrylate; a carboxyl group-containing monomer and a salt thereof, such as (meth)acrylic acid, itaconic acid and crotonic acid; an aromatic vinyl monomer such as styrene and α-methylstyrene; maleimides such as maleimide and phenylmaleimide; a sulfonic acid group-containing vinyl monomer and a salt thereof, such as (meth)allylsulfonic cid, (meth)allyloxybenzenesulfonic acid, styrenesulfonic acid and 2-acrylamide-2-methylpropanesulfonic acid; (meth)acrylamide, and vinyl acetate.

Among these, a vinyl cyanide monomer is preferred because of its excellent compatibility with the polymer (A), and acrylonitrile is more preferred.

As for the another monomer (b2), one kind may be used alone, or two or more kinds may be used in combination.

The polymer (B) (100 mol %) is preferably used such that the phosphoric acid group-containing monomer (b1) unit accounts for 0.01 to 0.5 mol/kg, more preferably from 0.03 to 0.5 mol/kg, based on the binder resin composition.

When the content of the phosphoric acid group-containing monomer (b1) unit in the binder resin composition of 0.01 mol/kg or more, the binding property of the binder resin composition with a current collector is enhanced, whereas when the content is 0.5 mol/kg or less, the solubility or dispersibility of the binder resin composition for a solvent or a dispersion medium is enhanced and in turn, the binding property of the binder resin composition with a current collector is enhanced.

The proportion of the phosphoric acid group-containing monomer (b1) unit in the polymer (B) is preferably from 1 to 10 mol %, more preferably from 3 to 8 mol %.

The weight average molecular weight of the polymer (A) is preferably from 1,000 to 5,000,000 and for developing a sufficient binding property with a current collector, more preferably from 30,000 to 500,000.

The weight average molecular weight of the polymer (B) is preferably from 50,000 to 500,000, more preferably from 80,000 to 300,000.

The polymers (A) and (B) for use in the present invention can be produced by a known polymerization method and, for example, bulk polymerization, suspension polymerization, emulsion polymerization and solution polymerization can be used.

Among these, suspension polymerization is preferred, because the production is easy and the after-treatment process (recovery and purification) is easy.

As the polymerization initiator for use in the suspension polymerization, a water-soluble polymerization initiator is excellent in the polymerization initiation efficiency and the like and is preferred.

Examples of the water-soluble polymerization initiator include a persulfate such as potassium persulfate, ammonium persulfate and sodium persulfate; a water-soluble peroxide such as hydrogen peroxide; and water-soluble azo compound such as 2,2'-azobis(2-methylpropionamidine) dihydrochloride.

The oxidizing agent such as persulfate may be also used as a redox initiator by combining it with a reducing agent such as ammonium sulfite, sodium hydrogensulfite, sodium thiosulfate and hydrosulfite, or a polymerization promoter such as iron sulfate.

Among these polymerization initiators, a persulfate is preferred, because the polymer production is easy.

In the suspension polymerization, a chain transfer agent can be used for the purpose of adjusting the molecular weight or the like.

Examples of the chain transfer agent include a mercaptan compound, thioglycol, carbon tetrachloride, and an α-methylstyrene dimer.

In the suspension polymerization, a solvent other than water may be added so as to adjust the particle diameter of the polymer obtained.

Examples of the solvent other than water include amides such as N-methylpyrrolidone (NMP), N,N-dimethylacetamide and N,N-dimethylformamide; ureas such as N,N-dimethylethyleneurea, N,N-dimethylpropyleneurea and tetramethylurea; lactones such as γ-butyrolactone and γ-caprolactone; carbonates such as propylene carbonate; ketones such as acetone, methyl ethyl ketone, methyl isobutyl ketone and cyclohexanone; esters such as methyl acetate, ethyl acetate, n-butyl acetate, butylcellosolve acetate, butylcarbitol acetate, ethylcellosolve acetate and ethylcarbitol acetate; glymes such as diglyme, triglyme and tetraglyme; hydrocarbons such as toluene, xylene and cyclohexane; sulfoxides such as dimethyl sulfoxide; sulfones such as sulfolane; and alcohols such as methanol, isopropanol and n-butanol.

One of these solvents may be used alone, or two or more thereof may be used in combination.

In the case of producing the polymer by emulsion polymerization, an emulsifier can be used.

Examples of the emulsifier include an anionic emulsifier such as dodecylsulfate and dodecylbenzenesulfonate; a nonionic emulsifier such as polyoxyethylene alkyl ether and polyoxyethylene alkyl ester; and a cationic emulsifier such as alkyltrimethylammonium salt and alkylamine. As for the emulsifier, one kind may be used alone, or two or more kinds may be used in combination.

The polymer for use in the present invention can be produced, for example, in the case of the polymer (A), by charging (a1) a vinyl cyanide monomer and, if desired, (a2) another monomer in a solvent and holding the system at a polymerization temperature of 0 to 90° C., preferably from 50 to 60° C., for a polymerization time of 1 to 10 hours, preferably from 2 to 4 hours.

The vinyl cyanide monomer (a1) has a high polymerization heat and therefore, the polymerization is preferably allowed to proceed while adding dropwise the monomer in the solvent.

In the case of the polymer (B), the polymer can be produced by charging (b1) a phosphoric acid group-containing monomer and (b2) another monomer in a solvent and holding the system at a polymerization temperature of 0 to 90° C., preferably from 50 to 60° C., for a polymerization time of 1 to 10 hours, preferably from 2 to 4 hours.

The blending ratio between the polymer (A) and the polymer (B) is preferably from 99/1 to 20/80 (by mass).

From the standpoint of enhancing the binding property with a current collector, enhancing the electrochemical stability by the vinyl cyanide monomer unit and enhancing the uniformity of the electrode surface, the blending ratio between the polymer (A) and the polymer (B) is more preferably from 95/5 to 70/30 (by mass).

The binder resin composition of the present invention can be dissolved in NMP and then coated on a current collector. In this case, for enhancing the binding property with the current collector, the NMP-insoluble matter content in the polymers (A) and (B) is preferably small.

Specifically, the content of the NMP-insoluble matter is preferably 50 mass % or less, more preferably 25 mass % or less. Furthermore, dissolution phases of the polymers (A) and (B) are preferably compatibilized.

The binder resin composition of the present invention contains the polymers (A) and (B) of the present invention and further contains additives such as "binder" for enhancing the battery performance and "viscosity modifier" for enhancing the coatability.

Examples of the binder include a polymer such as styrene-butadiene rubber, poly(meth)acrylonitrile, ethylene-vinyl alcohol copolymer and vinyl acetate polymer; and a fluorine-based polymer such as polyvinylidene fluoride, tetrafluoroethylene and pentafluoropropylene.

Examples of the viscosity modifier include a cellulose-based polymer such as carboxymethylcellulose, methylcellulose and hydroxypropylcellulose, and an ammonium salt thereof; a poly(meth)acrylate such as sodium poly(meth)acrylate; a polyvinyl alcohol, a polyethylene oxide, polyvinylpyrrolidone, a copolymer of an acrylic acid or an acrylate and a vinyl alcohol, a maleic anhydride, a copolymer of a maleic acid or a fumaric acid and a vinyl alcohol, a modified polyvinyl alcohol, a modified polyacrylic acid, polyethylene glycol, and polycarboxylic acid.

The additive finally remaining in the electrode preferably has electrochemical stability.

The binder resin composition is in a form of a powder, a dope dissolved in a solvent, or a dope dispersed in a solvent.

The binder resin composition of the present invention can be produced by a known method.

The electrode mixture layer of the present invention contains the binder resin composition of the present invention. Specifically, the electrode mixture layer is a solid phase obtained by blending an active material in the binder resin composition of the present invention, and drying a solution made by dissolution in a solvent or a slurry made by dispersion in a dispersion medium.

The active material for use in the electrode mixture layer may be sufficient if the potential of the positive electrode material and the potential of the negative electrode material differ.

In the case of a lithium ion secondary battery, the positive electrode active material includes, for example, a lithium-containing metal composite oxide containing lithium and at least one or more kinds of metals selected from iron, cobalt, nickel, manganese and vanadium. As for the positive electrode active material, one kind may be used alone, or two or more kinds may be used in combination.

The negative electrode active material used includes, for example, a carbon material such as graphite, amorphous carbon, carbon fiber, coke and active carbon; and a composite of the carbon material with silicon, a metal such as tin and silver, or an oxide thereof. As for the negative electrode active material, one kind may be used alone, or two or more kinds may be used in combination.

An electrically conductive polymer may be also used as the positive electrode active material. The type of electrically conductive polymer is not particularly limited, but examples thereof include polyaniline, polythiophene, polyacetylene and a derivative thereof, polyparaphenylene and a derivative thereof, polypyrrole and a derivative thereof, polythienylene and a derivative thereof, polypyridinediyl and a derivative thereof, polyisothianaphthenylene and a derivative thereof, and polyarylene vinylene and a derivative thereof. Among others, a polymer of an aniline derivative soluble in an organic solvent is preferred.

The electrode of the present invention is used as an electrode for a nonaqueous electrolyte secondary battery, preferably as an electrode for a lithium ion secondary battery.

In a lithium ion secondary battery, it is preferable to use a lithium-containing metal composite oxide for the positive electrode and use graphite for the negative electrode. By employing such a combination, the voltage of the lithium ion secondary battery becomes about 4 V.

Incidentally, the positive electrode active material may be used in combination with a conduction aid.

Examples of the conduction aid include graphite, carbon black, and acetylene black. One of these conduction aids may be used alone, or two or more thereof may be used in combination.

As for the blending ratio between the binder resin composition and the electrode active material forming the electrode mixture layer of the positive electrode, the ratio of the binder resin composition is preferably from 0.1 to 10 parts by mass per 100 parts by mass of the electrode active material.

As for the blending ratio between the conduction aid and the electrode active material forming the electrode mixture layer of the positive electrode, the ratio of the conduction aid is preferably from 0 to 10 parts by mass, more preferably from 0.1 to 10 parts by mass, per 100 parts by mass of the electrode active material.

The solvent or dispersion medium used for the production of the electrode mixture layer may be sufficient if it is a material capable of uniformly dissolving or dispersing the binder resin composition.

Examples of the solvent or dispersion medium include NMP, a mixed solution of NMP and an ester-based solvent (such as ethyl acetate, n-butyl acetate, butylcellosolve acetate and butylcarbitol acetate), and a mixed solution of NMP and a glyme-based solvent (such as diglyme, triglyme and tetraglyme). Also, water may be used in combination.

One of these solvents or dispersion mediums may be used alone, or two or more thereof may be used in combination.

The amount of the solvent or dispersion medium used may be sufficient if it is not less than the required minimum amount with which the binder resin composition can keep its dissolved or dispersed state at ordinary temperature. However, in the process of preparing a slurry during the later-described production of an electrode of a lithium ion secondary battery, the viscosity is usually adjusted while adding a solvent and therefore, the solvent or dispersion medium is preferably used in an arbitrary amount not leading to over-dilution more than necessary.

The current collector may be sufficient if it is a material having electrical conductivity, and as the material, a metal can be used. Specifically, aluminum, copper and nickel can be used.

The shape of the current collector includes a thin film, a net, and a fiber. Among these, a thin film shape is preferred. The thickness of the current collector is preferably from 5 to 30 μm, more preferably from 8 to 25 μm.

The electrode for a nonaqueous electrolyte battery of the present invention can be produced using a known method and, for example, can be produced by coating a slurry containing the binder resin composition for an electrode of a battery, an active material and a solvent on a current collector, removing the solvent, and if desired, rolling the laminate to form an electrode mixture layer on the current collector surface. The coating step can be performed using a comma coater or the like.

A battery can be fabricated by further combining the electrode for a battery of the present invention with an electrolytic solution.

For the electrolytic solution, a solution obtained by dissolving an electrolyte in organic solvents.

Examples of the organic solvents include carbonates such as propylene carbonate, ethylene carbonate, butylene carbonate, dimethyl carbonate, diethyl carbonate and methylethyl carbonate; lactones such as γ-butyrolactone; ethers such as trimethoxymethane, 1,2-dimethoxyethane, diethyl ether, 2-ethoxyethane, tetrahydrofuran and 2-methyltetrahydrofuran; sulfoxides such as dimethylsulfoxide; oxolanes such as 1,3-dioxolane and 4-methyl-1,3-dioxolane; nitrogen-containing compounds such as acetonitrile, nitromethane and NMP; esters such as methyl formate, methyl acetate, butyl acetate, methyl propionate, ethyl propionate and phosphoric acid triester; glymes such as diglyme, triglyme and tetraglyme; ketones such as acetone, diethyl ketone, methyl ethyl ketone and methyl isobutyl ketone; sulfones such as sulfolane; oxazolidinones such as 3-methyl-2-oxazolidinone; and sultones such as 1,3-propanesultone, 4-butanesultone and naphthasultone.

As for the organic solvents, one kind may be used alone, or two or more kinds may be used in combination.

Examples of the electrolyte include $LiClO_4$, $LiBF_4$, $LiI$, $LiPF_6$, $LiCF_3SO_3$, $LiCF_3CO_2$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$, $Li(CF_3SO_2)_2N$ and $Li[(CO_2)_2]_2B$.

Among these electrolytic solutions, a solution obtained by dissolving $LiPF_6$ in carbonates is preferred.

The battery can be produced using a known method and, for example, in the case of a lithium ion secondary battery, two electrodes of a positive electrode and a negative electrode are wound together in the form of a roll while interposing a separator made of a microporous polyethylene film therebetween. The obtained spiral-wound assembly is inserted into a battery can, and a tab terminal welded in advance to the current collector of the negative electrode is welded to the bottom of the battery can. The electrolytic solution is injected into the obtained battery can; a tab terminal welded in advance to the current collector of the positive electrode is welded to the lid of the battery; the lid is disposed on the top of the battery can through an insulating gasket; and the portion where the lid and battery can are in contact is swaged closed, whereby a battery is obtained.

EXAMPLES

The present invention is described in detail below by referring to Examples and Comparative Examples. However, the present invention is not limited thereto. In the following, "%" indicates "mass %".

The method for measuring the weight average molecular weight and molecular weight distribution of the polymer in Production Examples 1 to 4 is as follows.

(Weight Average Molecular Weight and Molecular Weight Distribution of Polymer (A1))

10 mg of the polymer obtained in Production Example was dissolved in 10 mL of N,N-dimethylformamide (hereinafter, referred to as DMF), and the resulting solution was filtered through a 0.5 μm membrane filter to prepare a sample solution. This sample solution was measured using Gel Permeation Chromatography (GPC) HLC-8020 manufactured by Tosoh Corporation. In the measurement, two TSKgel Super-HZM-H (trade name) (4.6 mm inner diameter×15 cm length) manufactured by Tosoh Corporation connected in series were used as the separation column, and the measurement was performed under the conditions that the solvent was DMF containing 0.01 mol/L of lithium chloride, the flow rate was 0.6 mL/min, the detector was a diffraction refractometer, the measurement temperature was 40° C., the injection amount was 0.1 mL, and the standard polymer was polystyrene.

Production Example 1

Production of Polymer PA-1

A 2 L-volume SUS 314-made separable flask equipped with a stirrer, a thermometer, a condenser and a nitrogen gas inlet tube was charged with 940 g of distilled water, and bubbling was performed for 15 minutes by flowing a nitrogen gas into the distilled water at a gas flow rate of 100 mL/min. Thereafter, the nitrogen gas flow was switched to overflow and while stirring, the flask was heated to 60° C. Subsequently, 2.16 g of ammonium persulfate as the polymerization initiator, 6.48 g of an aqueous 50% ammonium sulfite solution, and 0.15 g of an aqueous 0.1% iron sulfate were poured by using 30 g of distilled water.

100 g of acrylonitrile was subjected to bubbling for 15 minutes at a nitrogen gas flow rate of 20 mL/min and then added dropwise to the flask over 30 minutes. After the completion of dropwise addition, the system was kept at the same temperature for 2 hours to allow for progress of polymerization. Thereafter, stirring was stopped, and the reaction solution was water-cooled and suction-filtered. The obtained precipitate was washed with 10 L of warm water at 55° C., and a slurry solution of the precipitate was suction-filtered. The obtained precipitate was dried at 65° C. for 24 hours to obtain Polymer PA-1 (polyacrylonitrile). The yield by weight was 78%. The weight average molecular weight was 284,000, and the molecular weight distribution was 1.79.

Production Example 2

Production of Polymer PA-2

Polymer PA-2 (a copolymer of acrylonitrile unit/vinyl acetate unit=92.7/7.3 (molar ratio)) was obtained using the same conditions and procedure as in Production Example 1 except that 93.1 g of acrylonitrile and 6.9 g of vinyl acetate were used as the monomer in place of 100 g of acrylonitrile. The yield by weight was 82%. The weight average molecular weight was 307,000, and the molecular weight distribution was 1.85.

Production Example 3

Production of Polymer PA-3

A 2 L-volume SUS 314-made separable flask equipped with a stirrer, a thermometer, a condenser and a nitrogen gas inlet tube was charged with 940 g of distilled water, and bubbling was performed for 15 minutes by flowing a nitrogen gas into the distilled water at a gas flow rate of 100 mL/min. Thereafter, the nitrogen gas flow was switched to overflow and while stirring, the flask was heated to 60° C. Subsequently, 8.64 g of ammonium persulfate as the polymerization initiator, 25.92 g of an aqueous 50% ammonium sulfite solution, and 0.6 g of an aqueous 0.1% iron sulfate were poured by using 30 g of distilled water.

82.32 g of acrylonitrile and 17.68 g of 2-methacryloyloxyethyl acid phosphate (Lite Acrylate P1-M, trade name, produced by Kyoeisha Chemical Co., Ltd.) were uniformly mixed and after bubbling for 15 minutes at a nitrogen gas flow rate of 20 mL/min, the mixture was added dropwise to the flask over 30 minutes. Thereafter, the same procedure as in Production Example 1 was performed to obtain Polymer PA-3 (a copolymer of acrylonitrile unit/2-methacryloyloxyethyl acid phosphate unit=96.5/3.5 (molar ratio)). The yield by weight was 70%. The weight average molecular weight was 195,000, and the molecular weight distribution was 1.98.

Production Example 4

Production of Polymer PA-4

Polymer PA-4 (a copolymer of acrylonitrile unit/vinyl acetate unit/N,N-methylenebisacrylamide unit=92.4/7.2/0.4 (molar ratio)) was obtained using the same conditions and procedure as in Production Example 2 except that 1.0 g of N,N-methylenebisacrylamide was used as the monomer in addition to acrylonitrile and vinyl acetate. The yield by weight was 94%. The weight average molecular weight was 594,000, and the molecular weight distribution was 2.59.

Examples 1 to 4 and Comparative Examples 1 and 2

Each of Polymers PA-1 to PA-4 obtained in Production Examples 1 to 4 was mixed to give the binder resin composition (%) shown in Table 1 and thereby obtain a binder resin.

$I_S$ of the obtained binder resin was measured by the following procedure.

Also, various properties of a slurry using each binder resin, an electrode produced using the slurry, and a secondary battery manufactured using the electrode were evaluated by the following procedures. The results are shown in Table 1.

($I_S$ of Binder Resin)

9.5 Parts of N-methylpyrrolidone (hereinafter, NMP) was added to 0.5 parts of each of the binder resins of Examples 1 to 4 and Comparative Examples 1 and 2, and the mixture was stirred with a stirring bar for 24 hours to prepared a sample solution.

The particle diameter distribution of the binder resin in the sample solution was measured under the following measurement conditions by using Fiber-Optics Particle Analyzer FPAR-1000 (high sensitivity specification, diluted solution type probe) manufactured by Otsuka Electronics Co., Ltd.

Measurement Conditions:

the measurement at a temperature of 25° C. for an accumulated time of 180 seconds was repeated three times and after analysis by the Marquadt method, the particle size distribution data obtained by three measurements were averaged and taken as the particle size distribution of the binder resin. Incidentally, the particle diameter range was set to a range of 0.1 to 1,000,000 nm.

From the measurement results, the sum $I_S$ of scattering intensities observed in the particle diameter range of 1 to 100 nm was obtained.

(Preparation of Slurry)

100 Parts of lithium cobaltate (CELLSEED C-5H, trade name, produced by Nippon Chemical Industries Co., Ltd.; hereinafter, LCO) as the active material, 5 parts of acetylene black (Denka Black, trade name, produced by Denki Kagaku Kogyo K.K.; hereinafter, AB) as the conduction aid, and 2 parts of each of the binder resins of Examples 1 to 4 and Comparative Examples 1 and 2 were mixed with 40 parts of NMP by using a rotation/revolution stirrer (rotation: 1,000 rpm, revolution: 2,000 rpm, Thinky Mixer, manufactured by Thinky Corporation; hereinafter, mixer) to prepare a slurry.

(Thixotropy of Slurry)

The shear rate-viscosity curve of the obtained slurry was measured using a stress control rheometer, AR 550, manufactured by TA Instruments Waters LC. In the measurement, a cone/plate having a diameter of 40 mm and an angle of 2° was used, the gap was set to 69 mm, and the temperature was set to 20° C. The shear rate program was such that the measurement was started from 0.03 $sec^{-1}$ and after measuring the shear rate until 100 $sec^{-1}$ along with transfer to a high shear rate, the shear rate was again measured until 0.03 $sec^{-1}$ along with transfer to a low shear rate.

The thixotropy of the slurry was expressed by the value ($\eta_{0.1}/\eta_{80}$) obtained by dividing the viscosity ($\eta_{0.1}$) at a shear rate of 0.1 $sec^{-1}$ as a lower shear rate by the viscosity ($\eta_{80}$) at a shear rate of 80 $sec^{-1}$ after reaching the maximum shear rate of 100 $sec^{-1}$ and then transferring to a low shear rate in the shear rate program above.

As the value of $\eta_{0.1}/\eta_{80}$ is larger, the thixotropy of the slurry is higher. When the value of $\eta_{0.1}/\eta_{80}$ is 20 or more, the thixotropy can be said to be good.

(Uniformity of Electrode Mixture Layer)

The slurry prepared by the method above was coated on an aluminum foil (19 cm×25 cm, thickness: 20 μm) by a doctor blade, then dried at 80° C. for 1 hour in a circulating hot air drier and further dried under reduced pressure at 100° C. for 12 hours in a vacuum drier to obtain an electrode where an electrode mixture layer having a film thickness of 80 μm was coated on an aluminum foil.

The vertical cross-section of the obtained electrode was cut out using a cross-section sample preparing apparatus (SM-09010, manufactured by JOEL Ltd.), and in the cross-section, the portion where the surface of the electrode mixture layer and the adhesion interface of the aluminum foil and the electrode mixture layer can be observed at the same time was observed at three sites in a 1,000-fold visual field by using a scanning electron microscope (SU1510, manufactured by Hitachi High-Technologies Corporation). In the obtained image, the ratio (SU) of the area occupied by the LCO portion in the image of 10 μm×50 μm width from the electrode mixture layer surface to the electrode mixture layer center, and the ratio (SB) of the area occupied by the LCO portion in the image of 10 μm×50 μm width from the adhesion interface between the aluminum foil and the electrode mixture layer to the electrode mixture layer center, were determined by an image analysis software (Image-Pro PLUS ver. 4.5.0, produced by Media Cybernetics) and evaluated as follows.

A: the absolute value of (SU/SB)-1 is 0.1 or less.

B: the absolute value of (SU/SB)-1 is from more than 0.1 to 0.2 or less.

C: the absolute value of (SU/SB)-1 is more than 0.2.

Rating "A" indicates that an active material is homogeneously present in the entire electrode mixture layer and the coating material characteristics are good.

(Production of Positive Electrode for Secondary Battery)

100 Parts of LCO as the active material, 5 parts of AB as the conduction aid, and 2 parts of each of the binder resins of Examples 1 to 4 and Comparative Examples 1 and 2 were mixed with 40 parts of NMP by using the mixer to prepare a slurry. The slurry obtained was coated on an aluminum foil (19 cm×25 cm, thickness: 20 μm) by a doctor blade, then dried at 80° C. for 1 hour in a circulating hot air drier and further dried under reduced pressure at 100° C. for 12 hours in a vacuum drier to obtain an electrode having a film thickness of 80 μm.

(Manufacture of Secondary Battery (2016 Coin Cell))

The positive electrode obtained above and a metal lithium negative electrode were placed to face each other through a separator (Celgard #2400, trade name), and a 2016 coin cell battery was manufactured by using, as the nonaqueous electrolytic solution, a 1 M lithium hexafluorophosphate solution using a mixture of ethylene carbonate/diethyl carbonate=1/2 (volume ratio) as the solvent.

(Initial Battery Capacity of Secondary Battery)

Immediately after the manufacture of the 2016 coin cell battery, the battery capacity when charged to 4.2 V at 60° C. and a charging/discharging rate of 0.5 C by a constant current method (current density: 0.6 mA/g-active material) was measured, and the measured value was taken as the initial battery capacity.

TABLE 1

| | | Example | | | | Comparative Example | |
|---|---|---|---|---|---|---|---|
| | | 1 | 2 | 3 | 4 | 1 | 2 |
| Polymer (%) | PA-1 | 80 | | | | | |
| | PA-2 | | 90 | 80 | | 100 | |
| | PA-3 | 20 | 10 | 20 | | | 100 |
| | PA-4 | | | | 100 | | |
| Is | | 196.1 | 92.7 | 52.6 | 50.8 | not observed | 2.5 |
| $\eta_{0.1}/\eta_{80}$ | | 266 | 25 | 21 | 51 | 15 | 2 |
| Electrode mixture uniformity | | A | A | A | A | C | C |
| Initial battery capacity (mAh/g) | | 138 | 138 | 137 | 139 | 134 | 132 |

As seen in these results, the slurry using the binder resin of Examples 1 to 4 exhibited good thixotropy. It is supposed that as the thixotropy of the slurry is better, the storage stability of the slurry or the uniformity of the electrode mixture layer is more improved and the battery characteristics are more enhanced. In fact, the electrode obtained using such a slurry was good in the uniformity of the electrode mixture layer, and the initial battery capacity of secondary battery using the electrode was also good.

These are reviewed more specifically. First, in the binder resin of Comparative Example 1 using only Polymer PA-2 obtained in Production Example 2, the particle diameter distribution itself could not be measured due to lack of scattering intensity. This is considered to result because Polymer PA-2 was completely dissolved in NMP. On the other hand, in the binder resins of Examples 2 and 3 using Polymer PA-2 and another polymer in combination, the value of $I_S$ was large, and this is considered to lead to the result that the thixotropy of the obtained slurry was enhanced and the uniformity of the electrode mixture layer using the slurry as well as the initial battery capacity of the secondary battery using the electrode were enhanced.

Also, as compared with the binder resin of Comparative Example 2 using only Polymer PA-3 obtained in Production Example 3, in the binder resins of Examples 1 to 3 using Polymer PA-3 and another polymer in combination, the value of $I_S$ was large, and this is considered to lead to the result that the thixotropy of the obtained slurry was enhanced and the uniformity of the electrode mixture layer using the slurry as well as the initial battery capacity of the secondary battery using the electrode were enhanced. On the other hand, in the binder resins of Comparative Examples 1 and 2, the value of $I_S$ was less than 30 and therefore, the thixotropy was poor.

Also, in both of Comparative Examples 1 and 2 using Polymers PA-2 and PA-3, respectively, as a single polymer, the value of $\eta_{0.1}/\eta_{80}$ of the slurry was low, but in Examples 2 and 3 using those polymers in combination, the value of $\eta_{0.1}/\eta_{80}$ of the slurry surpassed those in Comparative Examples 1 and 2.

Production Example 5

Production (A-1) of Polymer (A)

A 2 L-volume SUS 314-made separable flask equipped with a stirrer, a thermometer, a condenser and a nitrogen gas inlet tube was charged with 940 g of distilled water, and bubbling was performed for 15 minutes under the condition of a nitrogen gas flow rate of 100 ml/min. While stirring, the temperature was raised to 60° C. and thereafter, the nitrogen gas flow was switched to overflow.

Subsequently, 2.16 g of ammonium persulfate as the polymerization initiator, 6.48 g of 50% ammonium sulfite as the reducing agent, and 0.15 g of 0.1% iron sulfate as the polymerization promoter were dissolved in 30 g of distilled water and then charged into the flask.

After bubbling 100 g of acrylonitrile with a nitrogen gas for 15 minutes, the acrylonitrile was added dropwise to the flask over 30 minutes. After the completion of dropwise addition, the system was maintained at the same temperature for 2 hours to allow for polymerization.

Thereafter, stirring was stopped, and the reaction solution was water-cooled and suction-filtered. The obtained polymer was washed with 10 L of warm water at 55° C. and dried at 65° C. for 24 hours to obtain the polymer (A). The yield was 78%. The weight average molecular weight of the polymer dissolved in the solvent used at the measurement of the weight average molecular weight was 313,000.

Production Example 6

Production (A-2) of Polymer (A)

The polymer (A) was obtained in the same manner as in Production Example 5 except for changing the amount of acrylonitrile to 93.1 g and further adding 6.9 g of vinyl acetate. The weight average molecular weight of the polymer dissolved in the solvent used at the measurement of the weight average molecular weight was 271,000.

Production Example 7

Production (B-1) of Polymer (B)

A 2 L-volume SUS 314-made separable flask equipped with a stirrer, a thermometer, a condenser and a nitrogen gas inlet tube was charged with 940 g of distilled water, and bubbling was performed for 15 minutes under the condition of a nitrogen gas flow rate of 100 ml/min. While stirring, the temperature was raised to 60° C. and thereafter, the nitrogen gas flow was switched to overflow.

Subsequently, 8.64 g of ammonium persulfate as the polymerization initiator, 25.92 g of 50% ammonium sulfite as the reducing agent, and 0.6 g of 0.1% iron sulfate as the polymerization promoter were charged into the flask by using 30 g of distilled water.

82.3 g of acrylonitrile and 17.6 g of 2-methacryloyloxyethyl phosphate (Lite Acrylate P1-M, trade name, produced by Kyoeisha Chemical Co., Ltd.) as the phosphoric acid group-containing monomer were uniformly mixed and after bubbling for 15 minutes with a nitrogen gas, the mixture was added dropwise to the flask over 30 minutes. After the completion of dropwise addition, the system was kept at the same temperature for 2 hours to allow for progress of polymerization.

Thereafter, stirring was stopped, and the reaction solution was water-cooled and suction-filtered. The obtained polymer was washed with 10 L of warm water at 55° C. and dried at 65° C. for 24 hours to obtain the polymer (B). The yield was 70%. The weight average molecular weight of the polymer in the portion dissolved in the solvent used at the measurement of the weight average molecular weight was 132,000.

Production Example 8

Production (B-2) of Polymer (B)

The polymer (B) was obtained in the same manner as in Production Example 7 except for changing the amount of acrylonitrile and the amount of 2-methacryloyloxyethyl phosphate to 78.0 g and 17.7 g, respectively, and further adding 6.5 g of n-butyl acrylate. The weight average molecular weight of the polymer in the portion dissolved in the solvent used at the measurement of the weight average molecular weight was 138,000.

Production Example 9

Production (B-3) of Polymer (B)

The polymer (B) was obtained in the same manner as in Production Example 7 except for changing the amount of acrylonitrile and the amount of 2-methacryloyloxyethyl phosphate to 78.0 g and 17.7 g, respectively, and further adding 6.5 g of vinyl acetate. The weight average molecular weight of the polymer in the portion dissolved in the solvent used at the measurement of the weight average molecular weight was 126,000.

Production Example 10

Production (B-4) of Polymer (B)

The polymer (B) was obtained in the same manner as in Production Example 7 except for changing the amount of acrylonitrile and the amount of 2-methacryloyloxyethyl phosphate to 75.5 g and 24.4 g, respectively. The weight average molecular weight of the polymer in the portion dissolved in the solvent used at the measurement of the weight average molecular weight was 131,000.

Production Example 11

Production (B-5) of Polymer (B)

The polymer (B) was obtained in the same manner as in Production Example 7 except for changing the amount of acrylonitrile and the amount of 2-methacryloyloxyethyl phosphate to 70.0 g and 30.0 g, respectively. The weight average molecular weight of the polymer in the portion dissolved in the solvent used at the measurement of the weight average molecular weight was 108,000.

Production Example 12

Production (B-6) of Polymer (B)

The polymer (B) was obtained in the same manner as in Production Example 7 except for changing the amount of acrylonitrile, the amount of 2-methacryloyloxyethyl phosphate, the amount of ammonium persulfate, the amount of 50% ammonium sulfite, and the amount of 0.1% iron sulfate to 96.3 g, 3.75 g, 2.16 g, 6.48 g and 0.15 g, respectively. The weight average molecular weight of the polymer in the portion dissolved in the solvent used at the measurement of the weight average molecular weight was 132,000.

Production Example 13

Production (B-7) of Polymer (B)

The polymer (B) was obtained in the same manner as in Production Example 7 except for changing the amount of acrylonitrile, the amount of 2-methacryloyloxyethyl phosphate, the amount of ammonium persulfate, the amount of 50% ammonium sulfite, and the amount of 0.1% iron sulfate to 96.0 g, 4.00 g, 2.16 g, 6.48 g and 0.15 g, respectively. The weight average molecular weight of the polymer in the portion dissolved in the solvent used at the measurement of the weight average molecular weight was 135,000.

Examples 5 to 17 and Comparative Examples 3 to 6

The polymer (A) and the polymer (B) were blended as shown in Table 2 to prepare a binder resin composition. The amount of the phosphoric acid group-containing monomer unit (b1), the peel strength and the electrode (positive electrode) surface uniformity were evaluated by the following methods. The results are shown in Table 2.

TABLE 2

|  |  |  | Example | | | | | | | | | |
|---|---|---|---|---|---|---|---|---|---|---|---|---|
|  |  |  | 5 | 6 | 7 | 8 | 9 | 10 | 11 | 12 | 13 |
| Compositional Ratio/ mass % | Production Example 5 | A-1 | 90 | 85 | 80 | 77.6 | 70 | 80 | 80 | 83 | 90 |
|  | Production Example 6 | A-2 | — | — | — | — | — | — | — | — | — |
|  | Production Example 7 | B-1 | 10 | 15 | 20 | 22.4 | 30 | — | — | — | — |
|  | Production Example 8 | B-2 | — | — | — | — | — | 20 | — | — | — |
|  | Production Example 9 | B-3 | — | — | — | — | — | — | 20 | — | — |
|  | Production Example 10 | B-4 | — | — | — | — | — | — | — | 17 | — |
|  | Production Example 11 | B-5 | — | — | — | — | — | — | — | — | 10 |
|  | Production Example 12 | B-6 | — | — | — | — | — | — | — | — | — |
|  | Production Example 13 | B-7 | — | — | — | — | — | — | — | — | — |
|  | Content of phosphoric acid group-containing monomer unit in polymer (B) (mol %) |  | 3.9 | 3.9 | 3.9 | 3.9 | 3.9 | 3.7 | 3.6 | 5.6 | 7.1 |
|  | Content of phosphoric acid group-containing monomer in binder resin composition (mol/kg) |  | 0.065 | 0.098 | 0.130 | 0.140 | 0.188 | 0.127 | 0.125 | 0.153 | 0.110 |
|  | Peel strength, n/cm |  | 1.4 | 1.5 | 2.5 | 2.7 | 2.8 | 2.4 | 2.1 | 2.2 | 2.3 |
|  | Electrode (positive electrode) surface uniformity |  | A | A | A | A | A | A | A | A | A |

TABLE 2-continued

| | | | Example | | | | Comparative Example | | | |
|---|---|---|---|---|---|---|---|---|---|---|
| | | | 14 | 15 | 16 | 17 | 3 | 4 | 5 | 6 |
| Compositional Ratio/ mass % | Production Example 5 | A-1 | 80 | — | — | 50 | 100 | — | — | — |
| | Production Example 6 | A-2 | — | 80 | 30 | — | — | — | — | — |
| | Production Example 7 | B-1 | — | 20 | 70 | — | — | 100 | — | — |
| | Production Example 8 | B-2 | — | — | — | — | — | — | — | — |
| | Production Example 9 | B-3 | — | — | — | — | — | — | — | — |
| | Production Example 10 | B-4 | — | — | — | — | — | — | — | — |
| | Production Example 11 | B-5 | 20 | — | — | — | — | — | — | — |
| | Production Example 12 | B-6 | — | — | — | — | — | — | 100 | — |
| | Production Example 13 | B-7 | — | — | — | 50 | — | — | — | 100 |
| Content of phosphoric acid group-containing monomer unit in polymer (B) (mol %) | | | 7.1 | 3.9 | 3.9 | 1.0 | 0.0 | 3.9 | 0.8 | 1.0 |
| Content of phosphoric acid group-containing monomer in binder resin composition (mol/kg) | | | 0.221 | 0.130 | 0.457 | 0.095 | — | 0.652 | 0.140 | 0.188 |
| Peel strength, n/cm | | | 2.1 | 2.4 | 2.6 | 1.3 | <0.1 | 2.8 | 1.6 | 1.8 |
| Electrode (positive electrode) surface uniformity | | | A | A | A | A | A | B | B | B |

(Measurement of Amount of Phosphoric Acid Group-Containing Monomer (b1) Unit in Polymer (B))

The amount of the phosphoric acid group-containing monomer unit (b) (hereinafter, simply referred to as "phosphoric acid amount") in the polymer (B) and the comparative polymer was determined by the ICP emission spectrometry.

First, 0.05 g of the sample was placed into a microwave decomposition vessel, and 15 ml of concentrated nitric acid was added thereto. The vessel was closed with a lid and set in a microwave apparatus, and decomposition was performed under the conditions shown in Table 3. Thereafter, the vessel was cooled, and the residual pressure was released. The lid was removed and after confirming with an eye that the contents were decomposed, the reaction solution was transferred to a glass-made volumetric flask by using a funnel and diluted with pure water to make 50 ml including the washing solution. After further making a 10-fold dilution with pure water, quantitative determination of phosphorus was performed by the ICP emission spectrometry. As the apparatus, an ICP emission analyzer, IRIS-AP, manufactured by Thermo Fisher Scientific K.K. was used.

TABLE 3

| Microwave Decomposition Conditions | | | |
|---|---|---|---|
| | Step 1 | Step 2 | Step 3 |
| Temperature, ° C. | 120 | 150 | 180 |
| Pressure PSI | 100 | 150 | 180 |
| Time, min | 5 | 5 | 5 |
| Power | 600 W-30% | 600 W-35% | 30%-40% |

The phosphoric acid amount in the binder resin composition obtained by blending the polymer (A) and the polymer (B) was calculated from the phosphoric acid amount and blending ratio of the polymer (B). The results are shown in Table 2.

(Measurement of Weight Average Molecular Weight of Polymer)

The weight average molecular weight was measured using HLC-8120 (manufactured by Tosoh Corporation) and a column (manufacturer, column property): TOSOH TSK-GEL, Super HZM-H (4.6 mm×15 cm) (manufactured by Tosoh Corporation) under the conditions of solvent: dimethylformamide containing 0.01 mol/L of lithium chloride, flow velocity: 0.6 mL/min, and sample concentration: 0.001 g/ml. The molecular weight of the polymer in the portion dissolved in the solvent under heating at 80° C. was derived.

(For Binding Property Test: Preparation of Binder Resin Composition Solution)

0.15 g of the binder resin composition (a single polymer of polymer (A), polymer (B) or comparative polymer, or a mixture of (A) and (B)) and 2.85 g of NMP (produced by Wako Pure Chemical Industries, Ltd. were charged into an ointment container (45×25 H mm) and mixed using a magnetic stirrer and a rotation/revolution mixer (hereinafter referred to as "mixer") to prepare a dope having a solid content of 5%.

(Production of CF Sheet for Binding Property Evaluation)

A PAN-based carbon fiber (CF) having a diameter of 7 μm and a chop length of 3 mm and a fibrous polyvinyl alcohol (produced by Unitika Ltd.) having a chop length of 3 mm were dispersed at a mass ratio of 2:1 in water, and the dispersion was processed by a paper machine to have a basis weight of 10 to 15 g/m² and dried.

The obtained paper-like CF was impregnated with a 15% Ferrite J-325/methanol solution (Ferrite J-325, trade name, produced by DIC Corporation), dried and then hot-pressed at 180° C. under 100 kg/cm².

This sheet was fired at 1,500° C. in a nitrogen atmosphere to produce a CF sheet.

(Production of Test Piece for Binding Property Evaluation)

The test piece for binding property evaluation was produced as follows.

Using an aluminum foil (300 mm×200 mm×20 μm) as the current collector, the foil was fixed on a glass plate and the dope of the binder resin composition was coated thereon to a thickness of 130 μm.

The above-described CF sheet (50 mm×100 mm) was placed in the dope-coated portion and thoroughly wetted with the dope. After drying at 100° C. for 1 hour and at 100° C. under vacuum for 12 hours, the aluminum foil was removed from the glass plate to obtain a sheet where the aluminum foil and the CF sheet were laminated together.

The obtained sheet was cut into a strip with a width of 10 mm, and the CF sheet side was adhered to a polycarbonate plate (50 mm×100 mm×1 mm) by using a 25 mm-wide double-sided tape (#570, trade name, produced by Sekisui Chemical Co., Ltd.). This laminate was pressure-bonded by moving a rubber-made roller thereover and used as a test piece.

(Evaluation of Binding Property)

The polycarbonate plate of the prepared test piece was fixed on a tensile/compression tester (Model SV-201, trade name, manufactured by Imada-SS Corporation), and the stress when peeling the aluminum foil at about 25° C. in the 180° direction at 5 mm/min was measured, whereby the binding property was evaluated.

As for the range measured, the portion where the CF sheet was separated from the aluminum foil and fully adhered to the tape side in the peeling process was recorded. The measurement was performed three times, and the average value thereof was taken as the peel strength. A higher value indicates a higher binding strength. The results are shown in Table 1. This evaluation was used as an index of the binding property of the binder resin composition with a current collector in a battery electrode.

(Uniformity of Electrode Mixture Surface)

The surface of an $LiCoO_2$-based electrode obtained from an electrode slurry capable of being coated on an aluminum foil after standing still for 2 days was confirmed with an eye and rated A when the surface was homogeneous or C when unevenness was observed. The rating was B also when gelling occurred at the slurry preparation and coating on a foil was difficult. The presence of unevenness suggests that the slurry gelled during standing still. The rating "A" indicates that the storage stability and coating material characteristics of the slurry were good. The results are shown in Table 2.

Example 18

Electrode Production 1: Production of Electrode Using $LiCoO_2$ as Active Material 2.0 g of NMP was put in an ointment container and after adding a stirrer chip, gently stirred. While stirring, 0.06 g of the binder resin composition of Example 3 was added little by little and after homogeneous stirring, the mixture was kneaded by a rotation/revolution mixer (hereinafter, mixer) for 2 minutes. Furthermore, 3.0 g of lithium cobaltate (CELL-SEED C-5H, produced by Nippon Chemical Industries Co., Ltd.) was added, and the mixture was kneaded by a mixer for 2 minutes. Thereafter, 0.15 g of acetylene black (Denka Black, produced by Denki Kagaku Kogyo K.K.) was added, and the mixture was further kneaded to obtain an electrode slurry. Subsequently, NMP was further added, and the slurry was kneaded, then coated on an aluminum foil by using an applicator and dried on a hot plate at 140° C. for 10 minutes to obtain an electrode.

The electrode for evaluating the uniformity of the electrode surface was obtained by leaving an electrode slurry capable of being coated on an aluminum foil to stand for 2 days and after coating the slurry, drying the coating on a hot plate at 140° C. for 10 minutes. Hereinafter, this electrode is referred to as an $LiCoO_2$-based electrode.

Example 19

Electrode Production 2: Production of Electrode Using Graphite as Active Material An electrode was produced by the same production method as in Electrode Production 1 except for changing the active material to graphite (AGB-5, trade name, Ito Kokuen Co., Ltd.) and changing the current collector foil to a copper foil. Hereinafter, this electrode is referred to as a graphite-based electrode.

(Manufacture of Coin Battery for Cycle Characteristic Evaluation)

Using the $LiCoO_2$-based electrode or the graphite-based electrode and using metal lithium as the counter electrode, both electrodes were placed to face each other through a separator (Celgard #2400, trade name), and a 2016 coin cell battery was manufactured by using a 1 M lithium hexafluorophosphate (ethylene carbonate/diethyl carbonate=1/2 (volume ratio)) as the electrolytic solution.

(Evaluation of Cycle Characteristics of $LiCoO_2$-Based Electrode)

In the measurement of the battery capacity, by setting the charging/discharging rate to 0.2 C and the temperature to 60° C., charging to 4.2 V by a constant current method (current density: 0.6 mA/g-active material) and then discharging to 3 V were repeated 100 times, and the discharge capacity at the 100th cycle was measured. The capacity retention was determined by dividing the discharge capacity at the 100th cycle by the initial capacity. A large numerical value indicates a good battery performance. The results are shown in Table 4.

(Evaluation of Cycle Characteristics of Graphite-Based Electrode)

In the measurement of the battery capacity, by setting the charging/discharging rate to 0.2 C and the temperature to 40° C., charging and discharging between 1.5 V and 0 V by a constant current method (current density: 0.6 mA/g-active material) were repeated 100 times, and the discharge capacity at the 100th cycle was measured. The capacity retention was determined by dividing the discharge capacity at the 100th cycle by the initial capacity. A large numerical value indicates a good battery performance. The results are shown in Table 4.

TABLE 4

| | | | Example 18 | Example 19 |
|---|---|---|---|---|
| Proportion of resin composition/ mass % | Production Example 5 | A-1 | 80 | 80 |
| | Production Example 7 | B-1 | 20 | 20 |
| | Production Example 12 | B-6 | — | — |
| Phosphoric acid group-containing monomer unit of polymer (B), mol % | | | 3.9 | 3.9 |
| Phosphoric acid group-containing monomer unit of binder resin composition, mol/kg | | | 0.130 | 0.130 |
| Type of electrode active material | | | $LiCoO_2$ | graphite |
| Proportion of mixture composition | Active material/parts | | 100 | 100 |
| | Acetylene black/parts | | 5 | 5 |
| | Binder/parts | | 2 | 2 |
| Cycle characteristics (%) | | | 90 | 96 |

As apparent from Table 2, in Examples 5 to 17, the binding strength was high, and the positive electrode surface uniformity was high. In Comparative Example 3 where the polymer (B) was not contained, the peel strength was low. In Comparative Example 4 where the polymer (A) was not contained, the positive electrode surface uniformity was poor. When the evaluation results were compared between Example 8 and Comparative Example 5, in Example 8 using the binder resin composition of the present invention, an excellent binding strength was exhibited as compared with the binder resin composition of Comparative Example 5 containing the same amount of phosphoric acid. This is presumed to result because in Comparative Example 5 where one kind of a polymer was used, the phosphoric acid group was uniformly distributed in the polymer and only a part of the phosphoric acid group could contribute to binding with the aluminum foil, whereas in Example 8 where two kinds of polymers (polymers (A) and (B)) were used, the polymer (B) having a phosphoric acid group was unevenly distributed near the interface with the aluminum face and many phosphoric acid groups could contribute to binding with the aluminum foil. In the case of using one kind of a polymer, when the phosphoric acid content was increased, unevenness was observed on the electrode surface (Comparative Example 5), but in the case of using two kinds of polymers, an electrode having a uniform electrode surface was obtained (Example 8). It has been found that in the case of using a phosphoric acid group-containing polymer as the binder, an electrode with good surface can be obtained by using two kinds of polymers in combination. The same results were confirmed by the comparison between Example 9 and Comparative Example 6.

As apparent from Table 4, it was confirmed that when the binder resin composition of the present invention is used, irrespective of whether the electrode is a positive electrode or a negative electrode, the battery operates (Example 18, Example 19).

For developing the same binding strength as that of the binder resin composition of Comparative Example 5, in the present invention, it may be sufficient to use a phosphoric acid amount of about 2/3 (Example 6). The phosphoric acid amount can be small, so that reduction in the mobility of lithium ion can be suppressed while maintaining the binding property between the current collector and the electrode mixture layer and the binding property with the active material and the rate characteristics of the battery can be expected to be enhanced.

INDUSTRIAL APPLICABILITY

According to the binder resin for an electrode of a nonaqueous electrolyte secondary battery of the present invention, when mixed with an active material and an organic solvent, a slurry composition having good thixotropy is obtained.

The slurry composition for an electrode of a nonaqueous electrolyte secondary battery of the present invention is obtained using the above-described binder resin for an electrode of a nonaqueous electrolyte secondary battery and has good thixotropy. Accordingly, the slurry composition for an electrode of a nonaqueous electrolyte secondary battery of the present invention is good in the storage stability. Furthermore, by using the slurry composition for an electrode of a nonaqueous electrolyte secondary battery of the present invention, an electrode for a nonaqueous electrolyte secondary battery, where an electrode mixture layer improved in the uniformity, adherence to a current collector, and the like is formed on a current collector, is obtained.

The electrode for a nonaqueous electrolyte secondary battery of the present invention is good in the uniformity of the electrode mixture layer, the adherence to a current collector, and the like. For this reason, according to a nonaqueous electrolyte secondary battery having the electrode, good battery characteristics are obtained.

The invention claimed is:

1. A halogen element-free binder resin for an electrode of a nonaqueous electrolyte secondary battery,
wherein the halogen element-free binder resin satisfies the following formula (1) . . . , $$I_S \geq 30 \tag{1}$$

wherein $I_s$ indicates the sum of scattering intensities observed in the particle diameter range of 1 to 100 nm, when the halogen element-free binder resin is dissolved in an organic solvent to form a solution having a concentration of 5 mass % and particle size distribution is measured at 25° C. by a dynamic light scattering method.

2. The halogen element-free binder resin according to claim 1,
wherein in a program of measuring shear rate starting from 0.03 sec$^{-1}$, measuring the shear rate until 100 sec$^{-1}$ along with transfer to a high shear rate, and again measuring the shear rate until 0.03 sec$^{-1}$ along with transfer to a low shear rate,
when a slurry composition obtained by mixing 100 parts by mass of an active material, 5 parts by mass of a conduction aid and 2 parts by mass of the binder resin with 40 parts by mass of the organic solvent by means of a rotation/revolution stirrer is measured for rheology at 25° C., the binder resin satisfies the following formula (2) and at the same time, dissolves in the organic solvent:

$$\eta_{0.1}/\eta_{18} \leq 20 \tag{2}$$

wherein $\eta_{0.1}$ indicates a viscosity at a shear rate of 0.1 sec$^{-1}$ when viscoelasticity is measured while changing the shear rate from 100 sec$^{-1}$ to 0.03 sec$^{-1}$, and $\eta_{80}$ indicates a viscosity at a shear rate of 80 sec$^{-1}$ when the viscoelasticity is measured while changing the shear rate from 100 sec$^{-1}$ to 0.03 sec$^{-1}$.

3. The halogen element-free binder resin according to claim 1, wherein the binder resin contains a polymer having a vinyl cyanide monomer unit.

4. A slurry composition of an electrode of a nonaqueous electrolyte secondary battery, comprising the halogen element-free binder resin according to claim 1, an active material and the organic solvent.

5. An electrode of a nonaqueous electrolyte secondary battery, comprising a current collector and an electrode mixture layer provided on the current collector,
wherein the electrode mixture layer comprises the halogen element-free binder resin according to claim 1 and an active material.

6. An electrode of a nonaqueous electrolyte secondary battery, comprising a current collector and an electrode mixture layer provided on the current collector,
wherein the electrode mixture layer is obtained by coating the slurry composition according to claim 4 on the current collector and drying the coating.

7. A nonaqueous electrolyte secondary battery, comprising the electrode according to claim 5.

8. A binder resin composition of an electrode of a nonaqueous electrolyte battery, comprising the halogen element-free binder resin according to claim 1 wherein the halogen element-free binder resin comprises: a polymer (A) having a vinyl cyanide monomer (a1) unit as the main component; and a polymer (B) containing a phosphoric acid-containing monomer (b1) unit.

9. The binder resin composition according to claim 8, wherein the content of the phosphoric acid-containing monomer (b1) unit is from 0.01 to 0.5 mol/kg based on the binder resin composition.

10. A slurry composition of an electrode of a nonaqueous electrolyte battery, comprising the binder resin composition according to claim 8, an active material and the organic solvent.

11. An electrode of a nonaqueous electrolyte battery, comprising an electrode mixture layer containing the binder resin composition according to claim 8, an active material, and a current collector.

12. A nonaqueous electrolyte battery, comprising the electrode according to claim 11.

13. A slurry composition of an electrode of a nonaqueous electrolyte battery, comprising the binder resin composition according to claim 9, an active material and the organic solvent.

14. An electrode of a nonaqueous electrolyte battery, comprising an electrode mixture layer containing the binder resin composition to claim 9, an active material, and a current collector.

15. A nonaqueous electrolyte battery, comprising the electrode according to claim 14.

16. The halogen element-free binder resin according to claim 1, wherein the halogen element-free binder resin comprises:

50 mass % or more of a polymer (A) containing a vinyl cyanide monomer (a1) unit as a main component; and
a polymer (B) containing a phosphoric acid-containing monomer (b1) unit.

17. The halogen element-free binder resin according to claim 1, wherein the vinyl cyanide monomer (a1) unit is selected from the group consisting of acrylonitrile, methacrylonitrile, α-cyanoacrylate, dicyanovinylidene and fumaronitrile.

18. The halogen element-free binder resin according to claim 16, wherein the weight average molecular weight (Mw) of the polymer (A) is 5,000 to 50,000,000.

19. The halogen element-free binder resin according to claim 1, wherein the content of the phosphoric acid group-containing monomer (b1) unit is from 0.01 to 0.5 mol/kg based on the binder resin composition.

20. The halogen element-free binder resin according to claim 16, wherein the vinyl cyanide monomer (a1) unit includes the phosphoric acid group-containing (meth)acrylate selected from the group consisting of 2-(meth)acryloyloxyethyl acid phosphate, 2-(meth)acryloyloxyethyl acid phosphate.monoethanolamine salt, diphenyl((meth)acryloyloxyethyl) phosphate, (meth)acryloyloxypropyl acid phosphate, 3-chloro-2-acid.phosphoxypropyl (meth)acrylate, acid.phosphoxypolyoxyethylene glycol mono(meth)acrylate, and acid.phosphoxypolyoxypropylene glycol (meth)acrylate.

* * * * *